United States Patent
Pan et al.

(10) Patent No.: US 11,776,209 B2
(45) Date of Patent: Oct. 3, 2023

(54) IMAGE PROCESSING METHOD AND APPARATUS, ELECTRONIC DEVICE, AND STORAGE MEDIUM

(71) Applicant: Beijing Bytedance Network Technology Co., Ltd., Beijing (CN)

(72) Inventors: Jiali Pan, Beijing (CN); Yi Guo, Beijing (CN); Xiaofeng Li, Beijing (CN); Jinyuan Wu, Beijing (CN); Xu Chen, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/060,466

(22) Filed: Nov. 30, 2022

(65) Prior Publication Data

US 2023/0091710 A1    Mar. 23, 2023

Related U.S. Application Data

(63) Continuation of application No. PCT/CN2021/111737, filed on Aug. 10, 2021.

(30) Foreign Application Priority Data

Aug. 31, 2020   (CN) .......................... 202010901576.0

(51) Int. Cl.
*G06T 17/10*          (2006.01)
*G06F 3/04845*        (2022.01)
(Continued)

(52) U.S. Cl.
CPC .......... *G06T 17/10* (2013.01); *G06F 3/04845* (2013.01); *G06F 3/04847* (2013.01); *G06F 3/04883* (2013.01); *G06T 2200/24* (2013.01)

(58) Field of Classification Search
CPC ......... G09G 3/3233; G09G 2300/0426; G09G 2300/0819; G09G 2300/0842;
(Continued)

(56) References Cited

U.S. PATENT DOCUMENTS 10,671,343 B1 *   6/2020   Kim ........................ G06F 3/167
2012/0050281 A1   3/2012   Tanaka et al.
(Continued)

FOREIGN PATENT DOCUMENTS

CN     101162420 A  *  4/2008
CN     106303690 A     1/2017
(Continued)

OTHER PUBLICATIONS

International Search Report, dated Nov. 9, 2021, International Patent Application No. PCT/CN2021/111737, International Filing Date Aug. 10, 2021.

*Primary Examiner* — Stacy Khoo
(74) *Attorney, Agent, or Firm* — ARENTFOX SCHIFF LLP

(57) ABSTRACT

An image processing method and apparatus, an electronic device, and a storage medium are provided. The method comprises: obtaining a sliding trajectory inputted by a user on a display assembly; generating, according to the sliding trajectory, a first virtual model corresponding to the sliding trajectory; and displaying the first virtual model at a first position in a target image.

18 Claims, 9 Drawing Sheets

(51) Int. Cl.
*G06F 3/04847* (2022.01)
*G06F 3/04883* (2022.01)

(58) Field of Classification Search
CPC ... G09G 2300/0861; G09G 2310/0251; G09G 2320/0242; H10K 50/81; H10K 59/131; H10K 59/1216; H10K 59/126; G06F 3/04845; G06F 3/04847; G06F 3/0488; G06F 3/04883; G06T 17/10; G06T 19/20; G06T 2200/24; G06T 2219/2021
See application file for complete search history.

(56) References Cited

U.S. PATENT DOCUMENTS

| | | | |
|---|---|---|---|
| 2018/0144547 A1 | 5/2018 | Shakib et al. | |
| 2020/0201535 A1 | 6/2020 | Chen | |
| 2022/0238139 A1* | 7/2022 | Zheng | ................ H04N 21/439 |

FOREIGN PATENT DOCUMENTS

| | | |
|---|---|---|
| CN | 106779590 A | 5/2017 |
| CN | 106855778 A | 6/2017 |
| CN | 107635130 A | 1/2018 |
| CN | 108447017 A | 8/2018 |
| CN | 108520552 A | 9/2018 |
| CN | 108665467 A | 10/2018 |
| CN | 109766069 A | 5/2019 |
| CN | 110381210 A | 10/2019 |
| CN | 110639204 A | 1/2020 |
| CN | 112035041 A | 12/2020 |

* cited by examiner

IMAGE PROCESSING METHOD AND APPARATUS, ELECTRONIC DEVICE, AND STORAGE MEDIUM

This application is a continuation application of International Application No. PCT/CN2021/111737, filed on Aug. 10, 2021, which claims priority to Chinese Patent Application No. 202010901576.0, titled "IMAGE PROCESSING METHOD AND APPARATUS, ELECTRONIC DEVICE, AND STORAGE MEDIUM", filed on Aug. 31, 2020 with the China National Intellectual Property Administration, both of which are incorporated herein by reference in their entireties.

FIELD

The present disclosure relates to the field of information technology, and in particular to an image processing method and apparatus, an electronic device, and a storage medium.

BACKGROUND

With the development of smart terminals, more and more applications (APPs) may be installed in the smart terminals and provide corresponding services to users.

For example, applications in the conventional technology may be used to add a virtual model to predetermined images or images captured by terminal devices to enhance the interest of the images.

However, the virtual model added to the predetermined image or the image captured by the smart terminals in the conventional technology is set in advance. For example, the virtual model may be stored in advance in the applications, the terminal devices or remote servers. Virtual models available to the users are rather limited, reducing the flexibility of display of the virtual model.

SUMMARY

In order to solve or at least partially solve the above technical problems, a method for processing an image and apparatus, an electronic device and a storage medium are provided according to embodiments of the present disclosure. A virtual model that meets a user's needs can be generated in real time based on a sliding trajectory inputted by the user, thereby improving the flexibility of the virtual model.

A method for processing an image is provided according to an embodiment of the present disclosure. The method includes:
  acquiring a sliding trajectory inputted by a user on a display component;
  generating a first virtual model corresponding to the sliding trajectory based on the sliding trajectory; and
  displaying the first virtual model in a target image at a first position.

An apparatus for processing an image is further provided according to an embodiment of the present disclosure. The apparatus includes an acquisition module, a generation module and a display module.

The acquisition module is configured to acquire a sliding trajectory inputted by a user on a display component.

The generation module is configured to generate a first virtual model corresponding to the sliding trajectory based on the sliding trajectory.

The display module is configured to display the first virtual model in a target image at a first position.

An electronic device is provided according to an embodiment of the present disclosure. The electronic device includes:
  one or more processors;
  a storage device configured to store one or more programs, where
  the one or more programs, when being executed by the one or more processors, cause the one or more processors to perform the foregoing method for processing an image.

A computer-readable storage medium having computer programs stored thereon is provided according to an embodiment of the present disclosure. The computer programs, when being executed by a processor, implement the foregoing method for processing an image.

The technical solution according to the embodiments of the present disclosure has the following advantages over the conventional technology: with the method for processing an image according to the embodiments of the present disclosure, a sliding trajectory inputted by a user on a display component is acquired, a virtual model corresponding to the sliding trajectory is generated, and the virtual model is displayed in a target image at a first position, so that different virtual models can be generated based on different sliding trajectories inputted by the user. For example, different sliding trajectories with different shapes result in different virtual models with different shapes. Hence, the virtual model in the target image varies as the sliding trajectory inputted by the user varies, i.e. the virtual model meeting needs of the user can be generated in real time based on the sliding trajectory inputted by the user, thus increasing the flexibility of display of the virtual model.

BRIEF DESCRIPTION OF THE DRAWINGS

The above and other features, advantages and aspects of embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the originals and elements are not necessarily drawn to scale.

DETAILED DESCRIPTION

Figure 1:
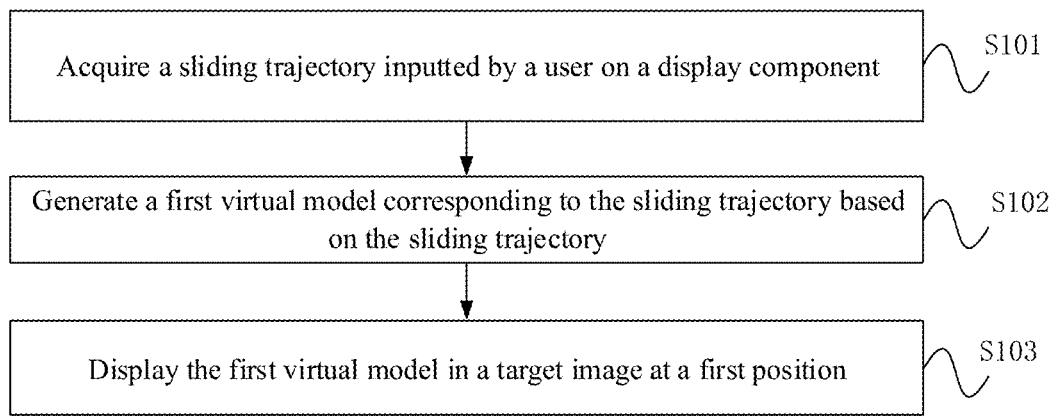
FIG. 1 is a flowchart of a method for processing an image according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" mentioned in the present disclosure are used to distinguish different apparatuses, modules or units, and are not used to limit an sequential order or interdependence of the functions performed by the apparatuses, modules or units.

It should be noted that the wordings such as "one" and "multiple" mentioned in the present disclosure are illustrative and not restrictive. Those skilled in the art should understand that the modifications should be understood as "one or more" unless otherwise expressly indicated in the context.

The names of the messages or information interacting between multiple devices in the present embodiment of the disclosure are for illustrative purposes only and are not intended to limit the scope of those messages or information.

FIG. 1 is a flowchart of a method for processing an image according to an embodiment of the present disclosure. The present embodiment may be applicable in a situation where image processing is performed in a client device. The method may be performed by an apparatus for processing an image. The apparatus may be implemented in software and/or hardware manner, and may be configured in an electronic device, such as a mobile terminal, including a mobile phone, a computer, a tablet or the like. Alternatively, the present embodiment is applicable to a situation where image processing is performed in a server. The method may be performed by an apparatus for processing an image. The apparatus may be implemented in software and/or hardware manner and may be configured in an electronic device, such as a server.

As shown in FIG. 1, the method may specifically comprise steps S101 to S103.

In S101, a sliding trajectory inputted by a user on a display component is acquired.

Figure 2:
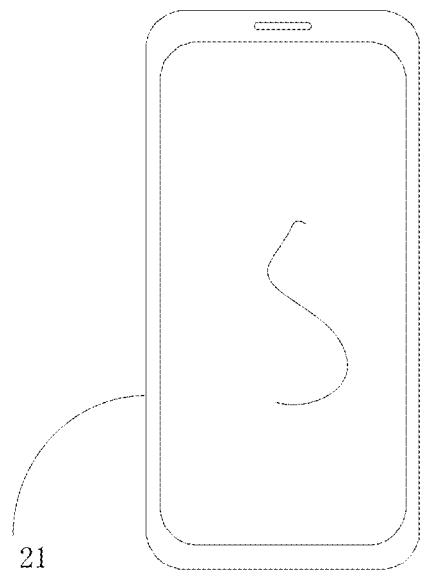
FIG. 2 is a schematic diagram of a sliding trajectory according to an embodiment of the present disclosure.

As shown in FIG. 2, a terminal 21 may be provided with a display component, which may specifically include a screen, for example a touch screen. The terminal 21 may acquire the sliding trajectory inputted by the user on the touch screen. Alternatively, the terminal 21 may be connected to an external display component, such as a touchpad, and the terminal 21 acquires the sliding trajectory inputted by the user on the touchpad.

Specifically, the terminal 21 may be further provided with a camera. Once the user presses a camera button of the terminal 21, the camera may be used to capture images, such as images of a human face. Alternatively, the terminal 21 may be provided with an image-based or video-based application. The camera captures images when being invoked by the application, and the captured images may be previewed on the display component. In the embodiment of the present disclosure, the terminal 21 may add a virtual model into the image. For example, in a case that the user needs to display the virtual model on the image, the user may make a sliding on the display component such that the terminal 21 may acquire the sliding trajectory of the user on the display component. Alternatively, a virtual model trigger button may be displayed on the display component of the terminal 21 or a user interface of the application, and the terminal 21 may detect and acquire the sliding trajectory inputted by the user on the display component based on an operation of the user on the virtual model trigger button. The sliding trajectory may be a continuous curve, as shown in FIG. 2. In some possible implementations, the sliding trajectory may also be a straight line, which is not limited in the present embodiment.

In S102, a first virtual model corresponding to the sliding trajectory is generated based on the sliding trajectory.

Further, the terminal 21 may generate a virtual model corresponding to the sliding trajectory based on the sliding trajectory, and the virtual model is denoted as a first virtual model. The virtual model may be a three-dimensional model or a two-dimensional model. Since the first virtual model is generated based on the sliding trajectory of the user on the screen, the first virtual model has a shape similar to that of the sliding trajectory. For example, taking the sliding trajectory in FIG. 2 as an example, the first virtual model corresponding to the sliding trajectory may be a virtual model resembling a bullhorn.

In S103, the first virtual model is displayed in a target image at a first position.

Figure 3:
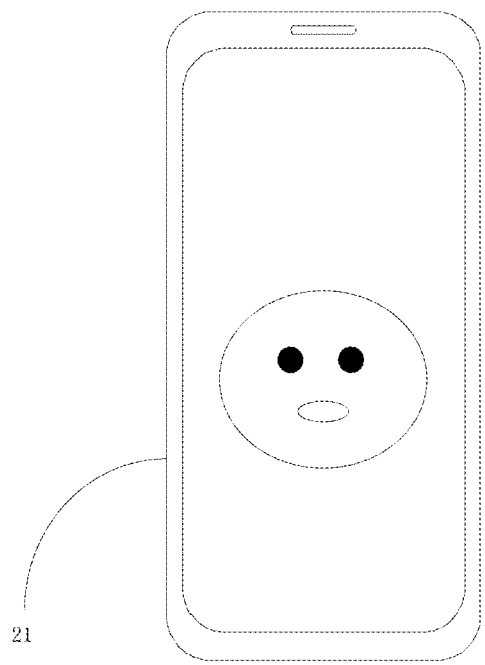
FIG. 3 is a schematic diagram of an image of a human face according to an embodiment of the present disclosure.

As shown in FIG. 3, a target image may be displayed on the screen of the terminal 21, and may, for example, include an image of human face. Further, taking the sliding trajectory in FIG. 2 as an example, the terminal generates the first virtual model resembling a bullhorn corresponding to the sliding trajectory based on the sliding trajectory. The terminal 21 may display the first virtual model resembling a bullhorn at the first position in the image of human face. The first position may be a predetermined position or a random position.

In a case that the first position is a predetermined position, the predetermined position may be determined by the user. For example, the predetermined position may be a position selected by the user in the display component or in the image of human face. Alternatively, the predetermined position may also be a position in the display component or in the image of human face that is determined in advance by the terminal 21. The predetermined position is not specifically limited in the present embodiment. In the exemplary illustration in FIG. 3, the first position may be a position on the forehead in the image of human face, and is denoted as (μ, v), which may denote the coordinates of the first position in a face coordinate system.

Figure 4:
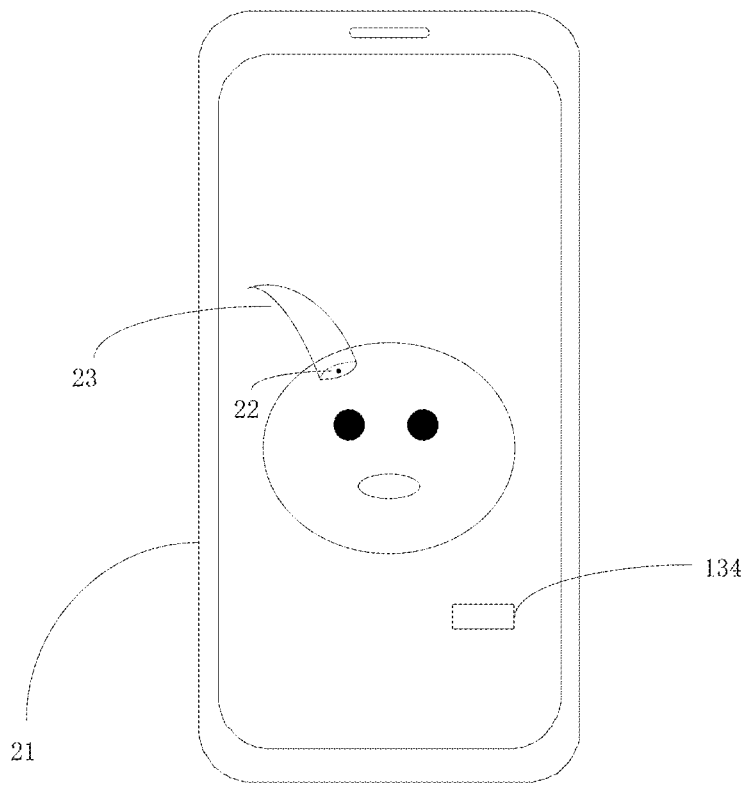
FIG. 4 is a schematic diagram of a virtual model according to an embodiment of the present disclosure.

Specifically, the terminal 21 may attach the first virtual model 23 resembling a bullhorn to the first position (μ, v), as shown in FIG. 4, where the numeral 22 indicates the first position (μ, v) and the numeral 23 indicates the first virtual model attached to the position (μ, v). The terminal 21 may attach the first virtual model 23 to the first position (μ, v) by means of stitching or the like.

With the method for processing an image according to the embodiment of the present disclosure, a sliding trajectory inputted by a user on a display component is acquired, a virtual model corresponding to the sliding trajectory is generated, and the virtual model is displayed in a target image at a first position, so that different virtual models can be generated based on different sliding trajectories inputted by the user. For example, different sliding trajectories with different shapes result in different virtual models with different shapes. Hence, the virtual model in the target image varies as the sliding trajectory inputted by the user varies, i.e. the virtual model meeting needs of the user can be generated in real time based on the sliding trajectory inputted by the user, thus increasing the flexibility of display of the virtual model.

On the basis of the above embodiment, the displaying the first virtual model in a target image at a first position includes: displaying the first virtual model at the first position of a target object in the target image.

As shown in FIG. 4, the terminal 21 may attach the first virtual model 23 to the first position 22 of the human face. The terminal 21, when attaching the first virtual model 23 to the first position 22 of the human face, may specifically overlap a center point of a bottom surface of the first virtual model 23 with the first position 22 of the human face. In one embodiment, a point at the first position 22 may specifically be a key point of the human face in the image. Further, the key point at the first position is oriented in the three-dimensional space in the same direction as a Y-axis of a model coordinate system in which the first virtual model 23 is located. The orientation of the key point in the three-dimensional space may be determined by a machine learning algorithm. The direction of the Y-axis of the model coordinate system may be a direction passing through the center point of the bottom surface of the first virtual model 23 and perpendicular to the bottom surface.

Optionally, after displaying the first virtual model at the first position of a target object in the target image, the method further includes: receiving a mirroring control instruction; determining, in response to the mirroring control instruction, a second position symmetrical to the first position on the target object; and displaying, at the second position, a second virtual model that is a mirror image of the first virtual model.

In one embodiment, the terminal 21 may receive a triggering operation from the user, for example, triggering for the "mirroring" button on the screen, voice triggering, gesture triggering, expression triggering, determine a second position symmetrical to the first position on the human face, and display, at the second position, a second virtual model that is a mirror image of the first virtual model. In another embodiment, after displaying the first virtual model at the first position of the human face in the target image, the terminal 21 may further, immediately or after a predetermined period of time, determine the second position symmetrical to the first position on the human face and display, at the second position, the second virtual model that is a mirror image of the first virtual model.

Figure 5:
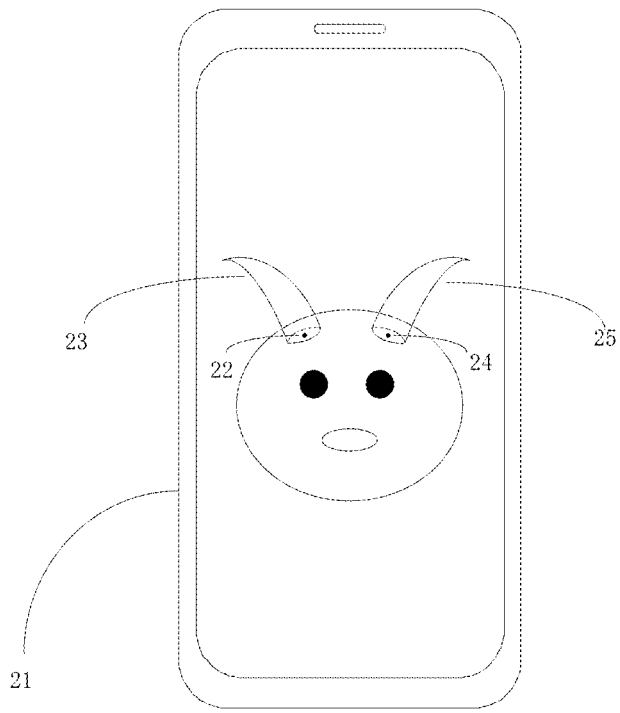
FIG. 5 is a schematic view of virtual models which are mirror images for each other according to an embodiment of the present disclosure.

For example, as shown in FIG. 4, a mirroring button 134 may be displayed on the display component or a user interface of the application of the terminal 21. The triggering operation may be performed on the mirroring button 134 by the user after the terminal 21 attaches the first virtual model 23 to the first position 22 of the human face. The triggering operation may trigger the terminal 21 to generate a mirroring control instruction. Further, in response to the mirroring control instruction, the terminal 21 may determine the second position symmetrical to the first position (μ, v) on the human face, e.g. the second position is denoted as (1−μ, v). Both (μ, v) and (1−μ, v) are coordinates in the face coordinate system. Further, the terminal 21 may display, at this second position (1−μ, v), the second virtual model that is a mirror image of the first virtual model 23. As shown in FIG. 5, the numeral 24 indicates the second position (1−μ, v) and the numeral 25 indicates the second virtual model 25 attached to (1−μ, v).

Specifically, the terminal 21 may implement the displaying, at the second position (1−μ, v), the second virtual model that is a mirror image of the first virtual model 23 in several possible implementations as follows.

In one possible implementation, on the basis of FIG. 4, the terminal 21 may firstly rotate the first virtual model 23 by 180 degrees to obtain the second virtual model 25, and then attach the second virtual model 25 to the second position 24.

In another possible implementation, on the basis of FIG. 4, the terminal 21 may firstly attach the first virtual model 23 to the second position 24. Then, the first virtual model 23 attached to the second position 24 is rotated by 180 degrees to obtain the second virtual model 25.

With the method for processing an image according to the embodiment of the present disclosure, by determining the second position symmetrical to the first position in the target image and displaying, at the second position, the second virtual model that is a mirror image of the first virtual model, the first virtual model attached to the first position and the second virtual model attached to the second position form a mirror effect. This not only saves the computational effort required to reconstruct the second virtual model, but also further improves the flexibility and aesthetics of display of the virtual model in the target image.

An exemplary illustration is given in FIG. 4 using an image of a human face as an example. It should be appreciated by those skilled in the art that in other embodiments, the target image is not limited to the image of human face, and may, for example, be an image of another object. The target object is not limited to a human face, and may, for example, be other objects and the like, which is not limited in the present disclosure.

Figure 6:
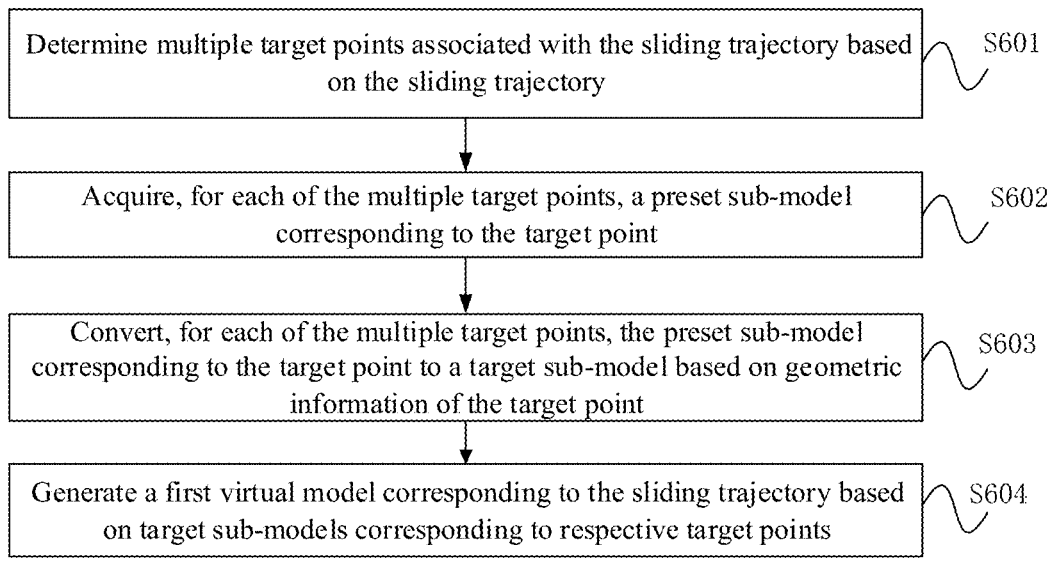
FIG. 6 is a flowchart of another method for processing an image according to an embodiment of the present disclosure.

As shown in FIG. 2, a sliding trajectory is inputted by the user on the screen. The process of generating a first virtual model corresponding to the sliding trajectory by the terminal 21 based on the sliding trajectory is described hereinafter, using the terminal 21 as an example. On the basis of the above embodiment, the generating a first virtual model corresponding to the sliding trajectory based on the sliding trajectory includes the following steps S601 to S604 as shown in FIG. 6.

In S601, multiple target points associated with the sliding trajectory are determined based on the sliding trajectory.

As shown in FIG. 2, after the sliding trajectory is inputted by the user on the screen, the terminal 21 may determine, based on the sliding trajectory, multiple target points associated with the sliding trajectory.

Figure 7:
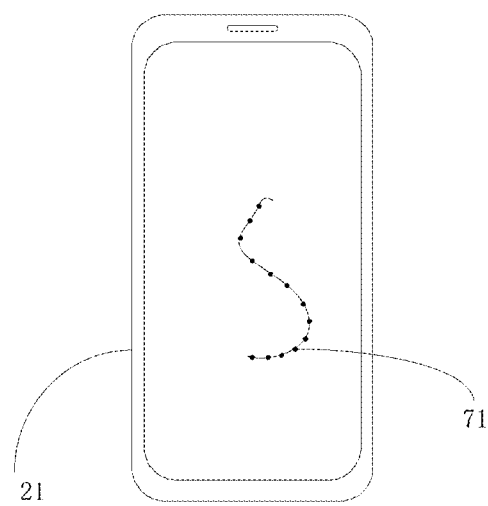
FIG. 7 is a schematic diagram of trajectory points according to an embodiment of the present disclosure.

In one possible implementation, the multiple target points associated with the sliding trajectory may specifically be multiple trajectory points or multiple sampling points on the sliding trajectory. As shown in FIG. 7, the sliding trajectory may consist of multiple trajectory points, each of which may act as a target point. Alternatively, the terminal 21 may uniformly or non-uniformly sample on the sliding trajectory to obtain multiple sampling points, each of which may serve as a target point. For example, a target point 71 may be any one of the multiple target points.

In another possible implementation, the determining multiple target points associated with the sliding trajectory, based on the sliding trajectory includes: determining multiple trajectory points on the sliding trajectory, based on the sliding trajectory; performing fitting calculation on the multiple trajectory points to obtain a fitted curve; and sampling the fitted curve to obtain multiple target points associated with the sliding trajectory. The target points include the sampling points on the fitted curve.

After the sliding trajectory is inputted by the user on the screen, the terminal 21 may obtain one or more trajectory points on the sliding trajectory based on the sliding trajectory. The present embodiment is illustrated schematically taking multiple trajectory points as an example. It is assumed that multiple points shown in FIG. 7 may be multiple trajectory points on the sliding trajectory. A point set may be formed by the multiple trajectory points, and is denoted as P, P={P1, P2, P3, . . . , Pn}. P1, P2, P3, . . . , Pn denote the trajectory points respectively. For example, the point set P includes n trajectory points. The value of n is not specifically limited herein. Specifically, P1, P2, P3, . . . , Pn may each be a two-dimensional point, i.e., the point set P may be a two-dimensional point set. For example, P1, P2, P3, . . . , Pn each may be a two-dimensional point in a screen coordinate system, the origin of which may be located at the bottom right corner of the screen.

Since a sliding speed corresponding to each of the trajectory points on the sliding trajectory is not uniform during the generation of the sliding trajectory, P1, P2, P3, . . . , Pn may not be uniformly distributed on the sliding trajectory. In the present embodiment, a predetermined fitting algorithm may be used for fitting calculation on P1, P2, P3, . . . , Pn to obtain a fitted curve. The fitting algorithm is not specifically limited in the present disclosure. For example, the fitted curve may be a cubic spline fitted curve. The fitted curve may be expressed as $y=ax^3+bx^2+cx+d$, where x represents the coordinate of any point on the fitted curve on the x-axis of the screen coordinate system and y represents a coordinate of any point on the fitted curve on the y-axis of the screen coordinate system. a, b, c and d each represents a fitting coefficient.

Further, the terminal 21 may sample the fitted curve, for example, uniformly or non-uniformly, to obtain one or more sampling points on the fitted curve. Specifically, multiple sampling points are illustrated schematically. For example, the multiple sampling points may be noted as C1, C2, C3, . . . , Cm, i.e. m sampling points. The value of m is not limited herein, and whether n is greater or smaller than m is not specifically limited herein. Further, the terminal 21 may use the sampling points C1, C2, C3, . . . , Cm as the multiple target points associated with the sliding trajectory. Each sampling point may be used as a target point. Similarly, C1, C2, C3, . . . , Cm may each be a two-dimensional point in the screen coordinate system.

In S602, for each of the multiple target points, a preset sub-model corresponding to the target point is acquired.

Taking using C1, C2, C3, . . . , Cm as the multiple target points associated with the sliding trajectory as an example, each target point may correspond to a preset sub-model. The preset sub-models corresponding to different target points may be the same or different. Further, the shape of the preset sub-model corresponding to each target point is not limited in the present disclosure. For example, the preset sub-model may be a regular or irregular solid, or may be a regular planar graph or an irregular planar graph.

Specifically, the terminal 21, after determining multiple target points associated with the sliding trajectory, may further acquire, for each of the multiple target points, a preset sub-model corresponding to the target point.

In S603, for each of the multiple target points, the preset sub-model corresponding to the target point is converted into a target sub-model based on geometric information of the target point.

Specifically, the preset sub-models corresponding to different target points of C1, C2, C3, . . . , Cm may have different shapes. For example, the preset sub-model corresponding to the target point C1 is of a shape of a cylinder and the preset sub-model corresponding to the target point C2 is of a shape of a cone.

Alternatively, the preset sub-models corresponding to different target points of C1, C2, C3, . . . , Cm may have the same shape, e.g., all of a shape of a cylinder. The cylinders corresponding to the different target points may have the same size or different sizes.

A case where the preset sub-models corresponding to different target points of C1, C2, C3, . . . , Cm are cylinders with different sizes is schematically illustrated in the present embodiment. For example, the cylinders corresponding to the target points of C1, C2, C3, . . . , Cm are reduced sequentially in size.

Further, the preset sub-model corresponding to the target point is converted to a target sub-model. For example, in the case of the target point C1, the preset sub-model corresponding to C1 is a cylinder without curvature, and the preset sub-model may be converted into the target sub-model of a shape of a cylinder with curvature.

Optionally, the geometric information of the target point includes at least one of: an offset of the target point relative to a starting trajectory point of the multiple trajectory points; or a tangent direction of the target point on the fitted curve.

For example, multiple points shown in FIG. 7 may be multiple trajectory points on the sliding trajectory. Among P1, P2, P3, . . . , Pn, the trajectory point P1 may be the starting trajectory point in the sliding trajectory. Since P1, P2, P3, . . . , Pn and C1, C2, C3, . . . , Cm each may be a two-dimensional point in the screen coordinate system, i.e. P1, P2, P3, . . . , Pn and C1, C2, C3, . . . , Cm are in the same coordinate system. The offset T of the target point C1 relative to the starting trajectory point P1 may be determined based on the coordinates of the target point C1 in the screen coordinate system and the coordinates of the starting trajectory point P1 in the screen coordinate system. Further, the tangent direction R of the target point C1 on the fitted curve may be determined. The offset of the target point C1 relative to the starting trajectory point P1 and/or the tangential direction of the target point C1 on the fitted curve may be denoted as the geometric information of the target point C1. It will be appreciated that the geometric information of the target point C1 is not limited thereto, and may include other geometric information. Alternatively, the geometric information of other target points than the target point C1 may be referred to the geometric information of the target point C1, which will not be repeated herein. In particular, the terminal 21 may, based on the geometric information of each target point of C1, C2, C3, . . . , Cm, convert the preset sub-model corresponding to each target point to the target sub-model.

Converting, for each of the multiple target points, the preset sub-model corresponding to the target point into a target sub-model based on the geometric information of the target point includes: converting the preset sub-model corresponding to the target point into the target sub-model based on the offset of the target point relative to the starting trajectory point and the tangent direction of the target point on the fitted curve.

For example, the preset sub-model corresponding to the target point C1 may be converted into a target sub-model based on the offset T of the target point C1 relative to the starting trajectory point P1, and the tangent direction R of the target point C1 on the fitted curve. Similarly, the preset sub-models corresponding to other target points may be converted into target sub-models based on offsets of other target points relative to the starting trajectory point P1 and tangent directions of other target points on the fitted curve.

It can be understood that the offsets of different target points of C1, C2, C3, . . . , Cm relative to the starting trajectory point P1 may be different. In addition, the tangent directions of different target points of C1, C2, C3, . . . , Cm on the fitted curve may be different. Therefore, the preset sub-models corresponding to different target points may be converted into different target sub-models based on the offsets of different target points of C1, C2, C3, . . . , Cm relative to the starting trajectory point P1, and the tangent directions of different target points on the fitted curve.

Optionally, converting the preset sub-model corresponding to the target point into a target sub-model based on an offset of the target point relative to the starting trajectory point and a tangent direction of the target point on the fitted curve includes: converting, based on the offset of the target point relative to the starting trajectory point and the tangent direction of the target point on the fitted curve, multiple first points on the preset sub-model corresponding to the target point to corresponding multiple second points; and generating the target sub-model corresponding to the target point based on the multiple second points.

Figure 8:
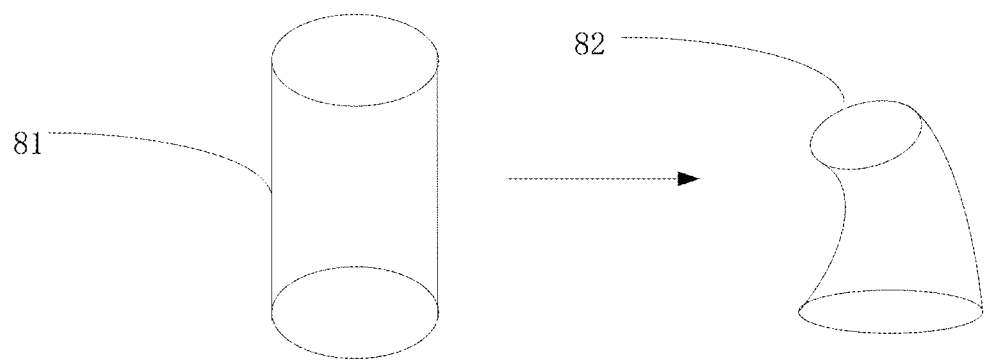
FIG. 8 is a schematic diagram of a preset sub-model and a target sub-model according to an embodiment of the present disclosure.

For example, taking the target point C1 as an example, the preset sub-model corresponding to C1 is of a shape of a cylinder without curvature, such as a cylinder 81 shown in FIG. 8. Points on an upper circular surface, a lower circular surface and a side wall of the cylinder may be used as vertices of the cylinder. The coordinate of each vertex on the cylinder may be converted to a new vertex coordinate based on the offset T of the target point C1 relative to the starting trajectory point P1 and the tangent direction R of the target point C1 on the fitted curve. Specifically, the vertex before the conversion may be noted as a first point, and the new vertex after the conversion may be noted as a second point. The first point and the second point correspond to each other. Further, based on the new vertex coordinates, the new vertices may be joined together to form a new cylinder.

Specifically, since the first points and the second points correspond to each other in one-to-one correspondence, the relative position relationship between the second points may be determined based on the relative position relationship between the first points. Further, adjacent second points may be joined to form a new cylinder based on the relative position relationship between the second points and the coordinates of respective second points. The new cylinder may be a cylinder having a curvature. Alternatively, the new cylinder may be denoted as a target sub-model.

Optionally, converting multiple first points on the preset sub-model corresponding to the target point to the corresponding multiple second points based on the offset of the target point relative to the starting trajectory point and the tangential direction of the target point on the fitted curve includes: converting the offset of the target point relative to the starting trajectory point to a three-dimensional offset; converting the tangential direction of the target point on the fitted curve to a three-dimensional tangent direction; and converting the multiple first points on the preset sub-model corresponding to the target point to the corresponding multiple second points based on the three-dimensional offset and the three-dimensional tangent direction.

For example, taking the target point C1 as an example, the preset sub-model corresponding to C1 is of a shape of a cylinder 81 as shown in FIG. 8. The points on the upper circular surface, the lower circular surface and the side wall of the cylinder may be used as vertices of the cylinder, and the coordinates of each vertex in the model coordinate system is denoted as V. The model coordinate system may be a three-dimensional coordinate system. Thus, each vertex on the preset sub-model corresponding to the target point C1 may be a three-dimensional point. Since the offset T of the target point C1 relative to the starting trajectory point P1 and the tangent direction R of the target point C1 on the fitted curve each is a two-dimensional vector, the offset T may be converted to a three-dimensional offset and the tangent direction R may be converted to a three-dimensional tangent direction. For example, a three-dimensional offset converted from the offset T is denoted as T1. Specifically, T1 may be the three-dimensional offset obtained by converting the offset T into the model coordinate system, or T1 may be the three-dimensional offset obtained by directly adding a third dimension value such as 0 to the offset T. Similarly, the three-dimensional tangential direction converted from the tangential direction R is denoted as R1. Specifically, R1 may be a three-dimensional tangential direction obtained by converting the tangential direction R into the model coordinate system, or R1 may be a three-dimensional tangential direction obtained by directly adding a third dimension value such as 0 to the tangential direction R.

Further, the coordinate V of each vertex on the preset sub-model corresponding to the target point C1 may be converted based on T1 and R1, and the converted coordinate is noted as V1. The relationship among V1, T1, R1 and V is shown in (1) as follows.

$$V1 = T1 * R1 * V \quad (1)$$

For example, each vertex on the preset sub-model corresponding to the target point C1 is denoted as the first point, and the point with the coordinate V1 converted from the coordinate V of the first point may be denoted as the second point. The first points and second points correspond to each other in one-to-one correspondence. Further, a target sub-model corresponding to the preset sub-model may be generated based on the second points corresponding to the first points. For example, adjacent points of each second point may be determined based on adjacent points of each first point. Further, the adjacent second points may be joined to form the target sub-model corresponding to the preset sub-model. For example, the target sub-model may be of a shape of a cylinder with a curvature, such as a cylinder 82 shown in FIG. 8. It will be understood that the conversion shown in FIG. 8 is only a schematic illustration and is not intended to be specific limitation.

Optionally, converting multiple first points on the preset sub-model corresponding to the target point to corresponding multiple second points based on the three-dimensional offset and the three-dimensional tangent direction includes: converting the multiple first points on the preset sub-model corresponding to the target point into the corresponding multiple second points based on the three-dimensional offset, the three-dimensional tangent direction, and a scaling value corresponding to the target point.

For example, in some embodiments, the preset sub-models corresponding to different target points of C1, C2, C3, . . . , Cm are cylinders of a same size. In this case, the different target points of C1, C2, C3, . . . , Cm may correspond to different scaling values. For example, the scaling values of preset sub-models corresponding to the target points of C1, C2, C3, . . . , Cm increase sequentially, where the larger the scaling value is, the smaller the target sub-model obtained by converting the preset sub-model is.

For example, the scaling value of the preset sub-model corresponding to target point C1 is denoted as S1, and the relationship among V1, T1, R1, V and S1 is shown in (2) below.

$$V1 = T1 * R1 * V * S1 \quad (2)$$

For example, each vertex on the preset sub-model corresponding to the target point C1 is denoted as the first point, and here, a point with the coordinate V1 converted from the coordinate V of the first point may be denoted as the second point. The first points and the second points correspond to each other in one-to-one correspondence. As shown in FIG. 8, the cylinder 82 is a new cylinder obtained after the conversion of the cylinder 81. Each vertex on the cylinder 82 is denoted as the second point. Vertexes on the cylinder 82 correspond to vertexes on the cylinder 81 in one-to-one correspondence. Alternatively, the cylinder 82 may be a scaled-down cylinder based on the scaling value corresponding to the target point C1.

In S604, a first virtual model corresponding to the sliding trajectory is generated based on the target sub-models corresponding to the respective target points.

The preset sub-models corresponding to different target points may be converted to different target sub-models based on the offsets of different target points of C1, C2, C3, . . . , Cm relative to the starting trajectory point P1 and the tangent directions of different target points on the fitted curve. Therefore, the first virtual model corresponding to the sliding trajectory of the user on the screen may be formed by joining the target sub-models corresponding to the respective target points of C1, C2, C3, . . . , Cm. Specifically, the target sub-models corresponding to the target points of C1, C2, C3, . . . , Cm are joined sequentially to form the first virtual model. For example, the lower circular surface of the target sub-model corresponding to the target point C1 may be used as the bottom surface of the first virtual model, the upper circular surface of the target sub-model corresponding to the target point C1 may be joined to the lower circular surface of the target sub-model corresponding to the target point C2, the upper circular surface of the target sub-model corresponding to the target point C2 may be joined to the lower circular surface of the target sub-model corresponding to the target point C3, and so on, to obtain the first virtual model. In other words, one target sub-model may be joined to another target sub-model.

In other embodiments, multiple target sub-models may be joined to one target sub-model. For example, multiple smaller target sub-models may be joined to a larger target sub-model, each smaller target sub-model may join one or more even smaller target sub-models, and so on, such that a bifurcation of the first virtual model may occur.

Optionally, generating a first virtual model corresponding to the sliding trajectory based on target sub-models corresponding to the respective target points includes: joining the target sub-models corresponding to the respective target points based on an identifier of each of the target points, to form the first virtual model corresponding to the sliding trajectory; where the identifier of the target point is used to determine a position of the target sub-model corresponding to the target point in the first virtual model.

Figure 9:
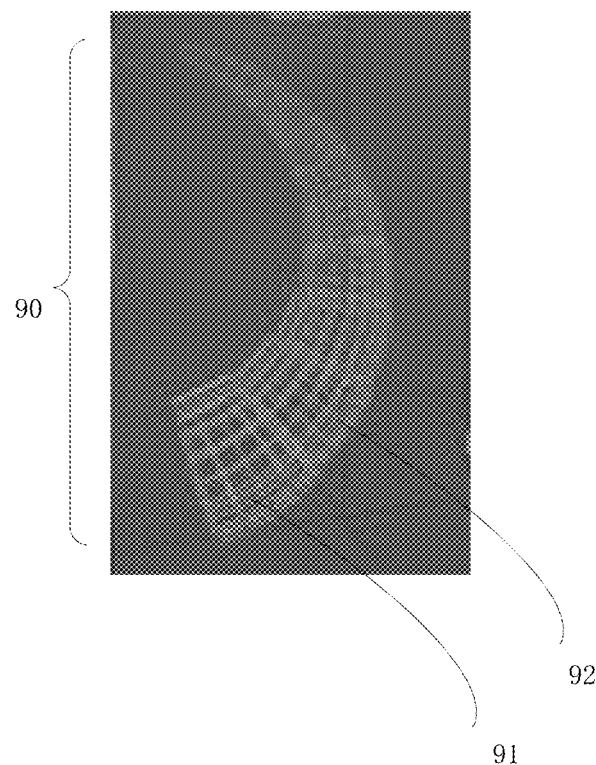
FIG. 9 is a schematic diagram of a virtual model according to an embodiment of the present disclosure.

As shown in FIG. 9, the target sub-model 91 may be the target sub-model corresponding to the target point C1, the target sub-model 92 may be the target sub-model corresponding to the target point C2, and so on. The target sub-models corresponding to the target points of C1, C2, C3, . . . , Cm are joined sequentially to form the first virtual model corresponding to the sliding trajectory of the user on the screen, which may be represented by the numeral 90 as shown in FIG. 9. In some other embodiments, the target sub-models corresponding to the target points of C1, C2, C3, . . . , Cm, converted from the preset sub-models corresponding to the target points as described above, may be already joined to each other, and in this case the join process may be omitted.

Specifically, each target point of C1, C2, C3, . . . , Cm may correspond to an identifier, e.g., an index. That is, each target point may correspond to an identifier, and each target point may have a unique identifier. Specifically, the identifier of a target point is used to determine a position of the target sub-model corresponding to the target point in the first virtual model 90. Optionally, each target sub-model may act as one element of the first virtual model 90. The position of each element in the first virtual model 90 may be denoted as a vertex color of the element.

In the method for processing an image according to the embodiment of the present disclosure, a user input a sliding trajectory on the screen, and the trajectory points in the sliding trajectory are determined. The trajectory points may be distributed unevenly on the sliding trajectory since the sliding speed corresponding to each trajectory point on the sliding trajectory is uneven. By performing fitting calculation on respective trajectory points, a fitted curve is obtained. The fitted curve is sampled, so that the sampling points are uniformly distributed on the fitted curve. Further, based on the uniformly distributed sampling points on the fitted curve, the preset sub-models corresponding to respective sampling points are converted to the target sub-models, and the first virtual model corresponding to the sliding trajectory is generated based on the target sub-models corresponding to respective sampling points. The similarity between the first virtual model and the sliding trajectory is improved, the first virtual model fulfills user's needs better, and the user experience is enhanced.

Figure 10:
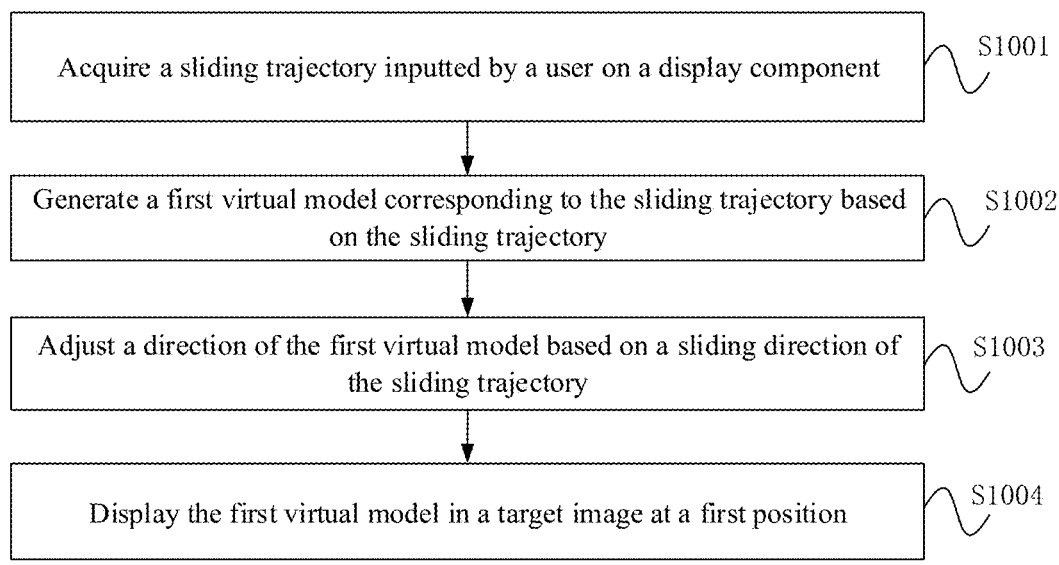
FIG. 10 is a flowchart of another method for processing an image according to an embodiment of the present disclosure.

FIG. 10 is a flowchart of another method for processing an image according to an embodiment of the present disclosure. The method for processing an image is further specified in the present embodiment on the basis of the above embodiment. Accordingly, as shown in FIG. 10, the method according to the present embodiment is applied to a terminal and specifically includes the following steps S1001 to S1004.

In S1001, a sliding trajectory inputted by a user on a display component is acquired.

Specifically, S1001 is similar to the process of acquiring the sliding trajectory of the user on the display component as described in the above embodiment and will not be repeated herein.

In S1002, a first virtual model corresponding to the sliding trajectory is generated based on the sliding trajectory.

Specifically, S1002 is similar to the process of generating a first virtual model corresponding to the sliding trajectory based on the sliding trajectory as described in the above embodiment, which is not repeated herein.

In S1003, a direction of the first virtual model is adjusted based on a sliding direction of the sliding trajectory.

Figure 11:
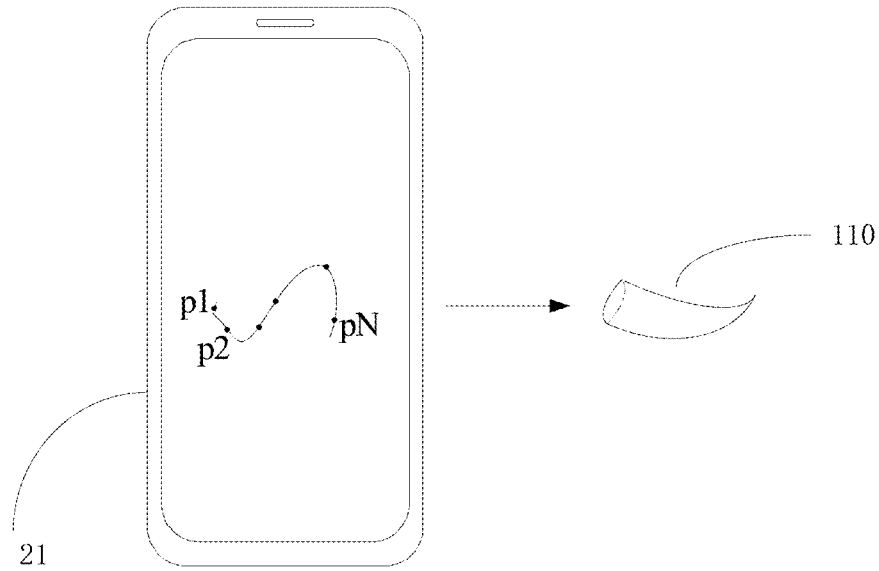
FIG. 11 is a schematic diagram of a sliding trajectory and a virtual model according to an embodiment of the present disclosure.

As shown in FIG. 7, the sliding direction of the sliding trajectory is longitudinal, for example from top to bottom, or from bottom to top. In some other embodiments, the sliding direction of the sliding trajectory may be transverse, for example from left to right, or from right to left, as shown in FIG. 11. In the present embodiment, the direction of the first virtual model may be adjusted based on the sliding direction of the sliding trajectory. The direction of the first virtual model may specifically be the direction of the Y-axis of the model coordinate system in which the first virtual model is located.

In addition, on the basis of the above embodiment, when acquiring the trajectory points P1, P2, P3, . . . , Pn based on the sliding trajectory, it is possible to acquire P1, P2, P3, . . . , Pn sequentially in the sliding direction of the sliding trajectory. In addition, the direction of the fitted curve fitted based on P1, P2, P3, . . . , Pn may be the same as the sliding direction of the sliding trajectory, and when sampling the fitted curve, the target points C1, C2, C3, . . . , Cm may be acquired sequentially in the sliding direction of the sliding trajectory.

Optionally, adjusting a direction of the first virtual model based on the sliding direction of the sliding trajectory includes: determining the direction of the starting trajectory point in the sliding trajectory relative to other trajectory points in the sliding trajectory; performing aggregation calculation on the direction of the starting trajectory point in the sliding trajectory relative to other trajectory points in the sliding trajectory to obtain an aggregated direction; and adjusting the direction of the first virtual model based on the aggregated direction.

For example, taking the sliding trajectory shown in FIG. 11 as an example, the sliding direction of the sliding trajectory is from left to right. Since the sliding trajectory is transverse, the first virtual model corresponding to the sliding trajectory is transverse, for example the first virtual model 110 as shown in FIG. 11. The direction of the first virtual model 110 may be adjusted based on the sliding direction of the sliding trajectory.

Specifically, P1 represents the starting trajectory point in the sliding trajectory, P2 represents a second trajectory point in the sliding trajectory, and so on, Pn is the n-th trajectory point in the sliding trajectory. The direction of the starting trajectory point P1 relative to other trajectory points may be determined based on the coordinates of trajectory points of P1, P2, P3, . . . , Pn. The direction of the starting trajectory point P1 relative to the other trajectory points may be specifically a vector pointing from the starting trajectory point P1 to the other trajectory points. For example, the vector pointing from the starting trajectory point P1 to the second trajectory point P2 is denoted as L1, the vector pointing from the starting trajectory point P1 to P3 is denoted as L2, and so on, the vector pointing from the starting trajectory point P1 to Pn is denoted as L(n−1). Specifically, L1, L2, . . . , L(n−1) form a set of vectors L, L={L1, L2, . . . , L(n−1)}. Further, clustering calculation is performed on each vector in the vector set L by using a predetermined clustering algorithm to obtain a clustered vector, the direction of the clustered vector being denoted as a principal axis direction, which is denoted as the aggregated direction. The clustering algorithm is not specifically limited in the present embodiment. Since each vector in the vector set L is a two-dimensional vector in the screen coordinate system, the clustered vector is a two-dimensional vector. Further, the aggregated direction may be converted into the model coordinate system to obtain a three-dimensional vector. The three-dimensional vector is denoted as K. The angle between the three-dimensional vector K and the Y-axis of the model coordinate system is calculated and converted to a three-dimensional matrix. As the first virtual model consists of multiple target sub-models and the vertex coordinates on each target sub-model are V1 as described in the above embodiment, the vertex coordinates on the first virtual model are denoted as V1. The first virtual model is rotated by multiplying coordinates V1 of each vertex on the first virtual model by the three-dimensional matrix. For example, the rotated first virtual model may be the first virtual model 23 as shown in FIG. 4 or FIG. 5.

It is understood that in a case that the sliding trajectory is a sliding trajectory as shown in FIG. 7, the direction of the first virtual model may be adjusted based on the sliding direction of the sliding trajectory, so that the first virtual model may be rotated into the first virtual model 23 as shown in FIG. 4 or FIG. 5. That is, the direction of the first virtual model may be adjusted by the sliding direction of the sliding trajectory, so that the first virtual model is always presented on the target image with right-side up, i.e. the center point of the bottom surface of the first virtual model 23 overlaps with an attachment point on the human face, where the attachment point is oriented in the three-dimensional space in the same direction as the Y-axis of the model coordinate system in which the first virtual model 23 is located.

In S1004, the first virtual model is displayed in a target image at a first position.

Specifically, the direction-adjusted first virtual model may be displayed at the first position in the target image. The first virtual model 23 shown in FIG. 4 or FIG. 5 is attached to the first position 22 of the human face. Here, the operation of displaying the direction-adjusted first virtual model at the first position in the target image may be referred to the process of displaying the first virtual model at the first position in the target image as described in the above embodiment and will not be repeated herein.

It will be understood that the order of execution of S1002 to S1004 is not limited in the present embodiment. For example, in some embodiments, S1003 may be executed after S1004. That is, after generating a first virtual model corresponding to the sliding trajectory based on the sliding trajectory, the first virtual model is firstly displayed at the first position in the target image, and then the direction of the first virtual model at the first position is adjusted.

It will be appreciated that, on the basis of the present embodiment, a second virtual model may further be displayed at a second position symmetrical to the first position, as shown in FIG. 5. The direction of the second virtual model may be adjusted in a way similar to that of adjusting the direction of the first virtual model and will not be repeated herein. In another optional implementation, the direction of the first virtual model may be adjusted firstly to obtain the adjusted first virtual model. A second position symmetrical to the first position is then determined and the second virtual model is displayed at the second position, where the second virtual model is a mirror image of the adjusted first virtual model.

With the method for processing an image according to the embodiments of the present disclosure, the direction of the first virtual model is adjusted based on the sliding direction of the sliding trajectory, so that the first virtual model is always presented on the target image with right-side up, thus preventing the sliding direction of the sliding trajectory from affecting the presentation of the first virtual model on the target image.

Figure 12:
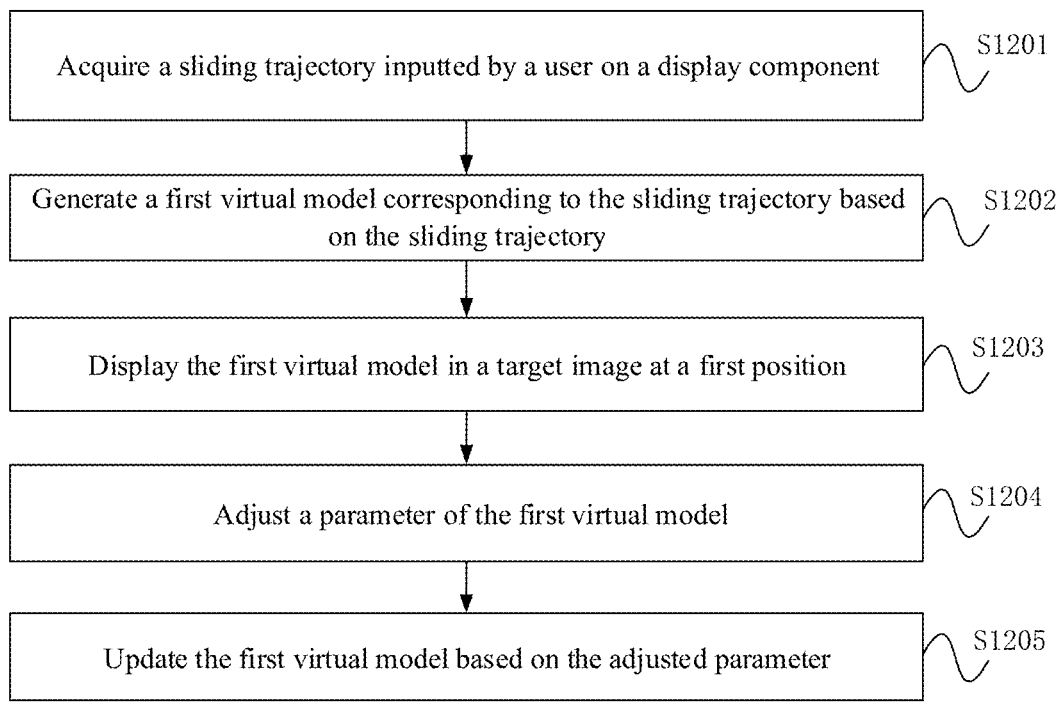
FIG. 12 is a flowchart of another method for processing an image according to an embodiment of the present disclosure.

FIG. 12 is a flowchart of another method for processing an image according to an embodiment of the present disclosure. The method for processing an image is further described specifically in the present embodiment on the basis of the above embodiments. Accordingly, as shown in FIG. 12, the method according to the present embodiment is applied to a terminal and specifically includes the following steps S1201 to S1205.

In S1201, a sliding trajectory inputted by a user on a display component is acquired.

Specifically, S1201 is implemented in the same manner and according to the same principles as S101 and will not be repeated herein.

In S1202, a first virtual model corresponding to the sliding trajectory is generated based on the sliding trajectory.

Specifically, S1202 may be referred to the process of generating a first virtual model corresponding to the sliding trajectory based on the sliding trajectory as described above, which will not be repeated herein.

In S1203, the first virtual model is displayed in a target image at a first position.

Specifically, S1203 may be referred to the process of displaying the first virtual model in a target image at a first position as described above, which will not be repeated herein.

In S1204, a parameter of the first virtual model is adjusted.

For example, after the first virtual model is displayed at the first position in the target image, the terminal 21 may adjust the parameter of the first virtual model according to user requirements and/or audio information. The audio information may be audio information in a surrounding environment of the terminal 21 or audio information played by the terminal 21.

In a possible implementation, adjusting a parameter of the first virtual model includes: receiving a parameter adjustment instruction for the first virtual model; and adjusting the parameter of the first virtual model in response to the parameter adjustment instruction.

Figure 13:
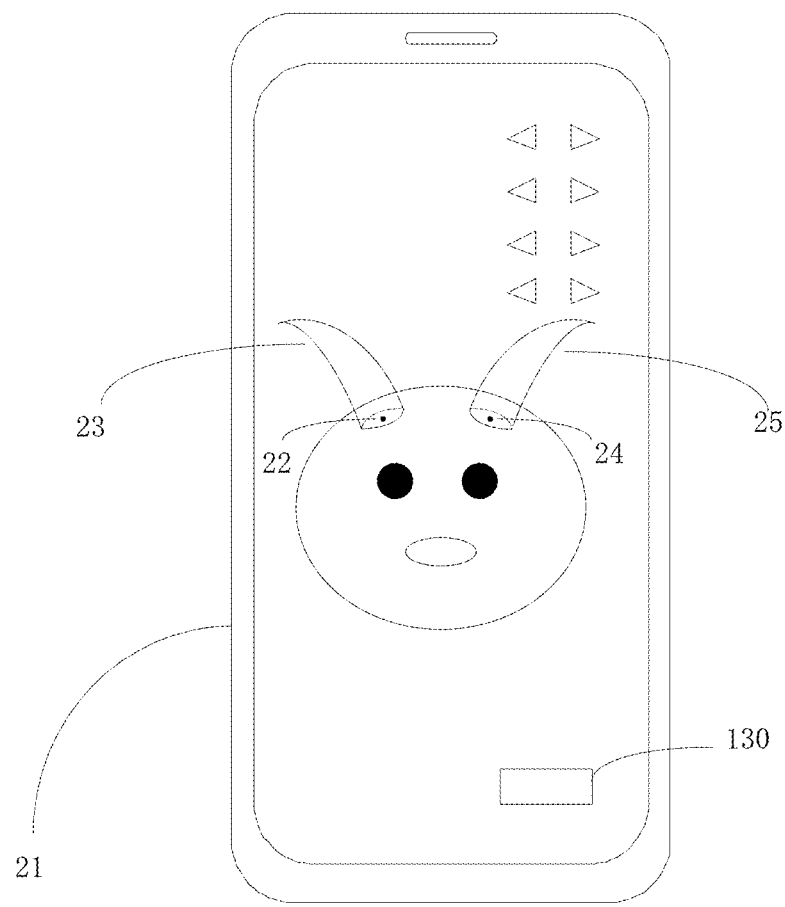
FIG. 13 is a schematic diagram of a user interface according to an embodiment of the present disclosure.

For example, an icon for adjusting the parameter of the virtual model may be displayed on the screen of the terminal. In a case that the user operates on the icon, the parameter adjustment instruction for the first virtual model may be triggered. In response to the parameter adjustment instruction, the terminal adjusts the parameter of the first virtual model. Specifically, the parameter of the first virtual model includes at least one of: a size, a radian, a quantity of sub-models, material of the sub-models, shapes of the sub-models, information related to the rotation of the sub-models, an angle of the sub-models, or the like. Specifically, the icon for adjusting the parameter of the virtual model may be multiple sets of arrows as shown in FIG. 13, where each set of arrows is used to adjust one parameter of the first virtual model, and different arrow directions indicate different adjustment directions, e.g., increasing or decreasing. The form of the icon for adjusting the parameter of the model and the manner in which the adjustment is triggered are not limited in the present disclosure.

In another possible implementation, adjusting the parameter of the first virtual model includes: acquiring audio information; and adjusting the parameter of the first virtual model based on a parameter of the audio information.

For example, the terminal 21 may capture audio information, and adjust the parameter of the first virtual model based on the parameter of the audio information. For example, the parameter of the audio information may include: a volume, a spectrum, a downbeat, a pitch, or the like. The parameter of the audio information may be referred to as attribute information of the audio information. The parameter of the first virtual model may be referred to as attribute information of the first virtual model. The correspondence between the parameter of the audio information and the parameter of the first virtual model is not limited in the present embodiment. For example, the terminal may adjust the size of the first virtual model based on the volume of the audio information, adjust the material of the first virtual model based on the downbeat of the audio information, and adjust the radian of the first virtual model based on the spectrum of the audio information. The material of the first virtual model may include a luminous material, a non-luminous material or the like.

In a feasible implementation, before acquiring audio information, the method further includes: receiving an audio playback instruction; and playing the audio information in response to the audio playback instruction.

For example, an audio switch button 130 may be displayed on the screen of the terminal shown in FIG. 13. The audio playback instruction may be triggered when the user operates the audio switch button 130. Further, the terminal 21 plays the audio information in response to the audio playback instruction. Further, the terminal 21 may capture the audio information and adjust the parameter of the first virtual model based on the parameter of the audio information.

In another feasible implementation, acquiring audio information includes: capturing audio information in a surrounding environment.

For example, in some other embodiments, instead of playing the audio information, the terminal 21 may capture audio information in the surrounding environment and, further, adjust the parameter of the first virtual model based on the parameter of the audio information.

In S1205, the first virtual model is updated based on the adjusted parameter.

For example, after adjusting the parameter of the first virtual model according to the method as described above, the terminal 21 may update the first virtual model based on the adjusted parameter. Further, the terminal 21 displays the updated first virtual model at the first position in the target image.

It can be appreciated that, after adjusting the parameter of the first virtual model and updating the first virtual model, the terminal 21 may further display, at a second position symmetrical to the first position, a second virtual model that is a mirror image of the updated first virtual model, with reference to the method as shown in FIG. 5.

Alternatively, in a case that multiple virtual models such as the first virtual model 23 and the second virtual model 25 shown in FIG. 5 are displayed in the target image, the foregoing method for adjusting the parameter of the first virtual model is also applicable to adjusting the parameter of the second virtual model, which is similar to the parameter of the first virtual model as described above and will not be repeated herein. In addition, the parameter of other virtual models other than the first virtual model and the second virtual model in the target image may be referred to the parameter of the first virtual model as described above. In particular, the parameter of the first virtual model and the parameter of the second virtual model may be adjusted simultaneously. For example, in response to the user's operation on an icon, the terminal may adjust the parameter corresponding to the icon, of both the first virtual model and the second virtual model. Alternatively, the parameter of the first virtual model and the parameter of the second virtual model may be adjusted separately. For example, the terminal may adjust the parameter, corresponding to a certain icon, of the first virtual model in response to the user's operation on the icon and adjust the parameter, corresponding to another icon, of the second virtual model in response to the user's operation on the another icon.

With the method for processing an image according to the embodiment of the present disclosure, after displaying the virtual model in the target image, the parameter of the virtual model may be adjusted based on the parameter adjustment instruction triggered by the user or the parameter of the audio information, so that the virtual model may change in real time in the target image, further improving the flexibility of displaying the virtual model in the target image.

Figure 14:
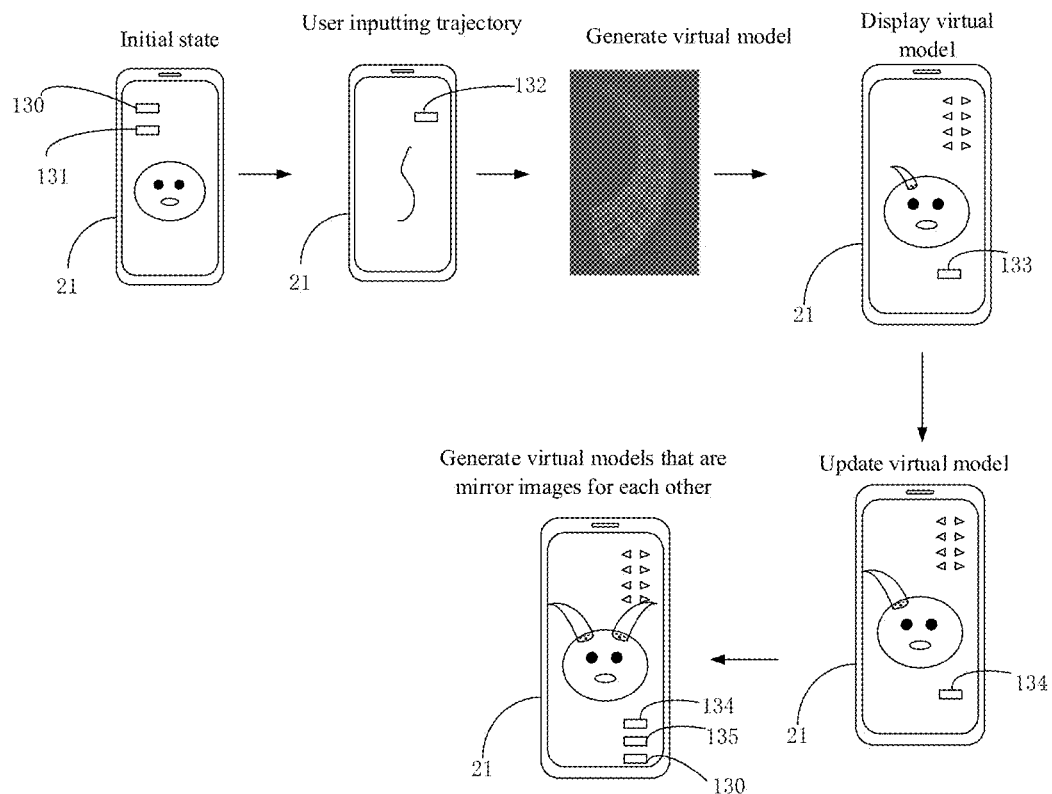
FIG. 14 is a flowchart of another method for processing an image according to an embodiment of the present disclosure.

The generation of the virtual model and the adjustment of the parameter of the virtual model are introduced hereinafter in a specific example. As shown in FIG. 14, in an initial state, the terminal 21 may capture an image of a human face through a camera. An audio switch button 130 and a start modeling button 131 may be displayed on the screen of the terminal 21. The terminal 21 may play audio information or stop playing audio information in response to the user's operation on the audio switch button 130. The terminal 21 may display a trajectory drawing area in response to the user's operation on the start modelling button 131, and the position of the trajectory drawing area is not limited in the present embodiment. For example, the trajectory drawing area may be displayed at any position on the screen. In addition, the image of human face may remain on the screen or may not be displayed on the screen during the display of the trajectory drawing area. When the image of human face and the trajectory drawing area are displayed on the screen at the same time, the image of human face and the trajectory drawing area may be located on the same layer or on separate layers. For example, the display layer of the trajectory drawing area may be located above the display layer of the image of a human face. Subsequently, the user inputs a trajectory in the trajectory drawing area. The terminal 21 generates a virtual model in response to the user's operation on a model generation button 132, in combination with the trajectory and a program algorithm. Further, the terminal 21 displays the virtual model at a first position in the human face. In this case, the parameter of the virtual model is adjustable in real time. For example, the terminal 21 adjusts the parameter of the virtual model in response to the user's operation on an arrow-like icon on the screen, so that the virtual model may be converted to a different look or a different material, such as, increasing the size of the virtual model. When the user finishes adjusting the parameter, the terminal 21 may update the virtual model in the image of human face in response to the user's operation on a finish adjustment button 133. Further, the terminal 21 may generate virtual models that are mirror images of each other in the image of human face in response to the user's operation on a mirroring button 134, thereby increasing the number of virtual models in the image of human face. Further, the terminal 21 may return to the initial state in response to the user's operation on a return button 135.

It can be appreciated that the virtual model is generated by the terminal by combining the trajectory inputted by the user with a program algorithm in the terminal. For the same trajectory inputted by the user, different virtual models may be constructed by the terminal in a case that different program algorithms are used. For example, for the same trajectory, in a case that a first program algorithm is used, the virtual model generated by the terminal may be a virtual model similar to a bullhorn as described above. In a case that a second program algorithm is used, the virtual model generated by the terminal may be a virtual model similar to an antler.

In one possible implementation, the first program algorithm and the second program algorithm use different preset sub-models. Thus, the first program algorithm and the second program algorithm generate different virtual models based on the same trajectory.

In another possible implementation, the first program algorithm and the second program algorithm generate the virtual model in different ways when constructing the virtual model. The generation manner may be the way in which multiple elements of the virtual model are joined together. For example, in a case of constructing the virtual model by the first program algorithm, one element may be joined to one element. For example, a larger cylinder is joined to a smaller cylinder. In a case of constructing the virtual model by the second program algorithm, multiple elements may be joined to one element. For example, multiple smaller cylinders may be joined to a larger cylinder, thus allowing for a bifurcation of the virtual model.

Specifically, identifiers of multiple virtual models or identifiers of multiple program algorithms may be displayed on the screen of the terminal, and a virtual model corresponding to the user-selected identifier of the virtual model or identifier of the program algorithm is generated based on the identifier in conjunction with the trajectory inputted by the user. This allows the virtual model to be more in line with the user's needs, i.e. the virtual model is generated in real time according to the user's needs, further improving the flexibility of the virtual model.

It can be appreciated that the virtual model is not limited to the bullhorn and the antler in a shape, and may be of other shapes. The program algorithm for constructing the virtual model is not limited to the first program algorithm and the second program algorithm, and other program algorithms may exist.

Figure 15:
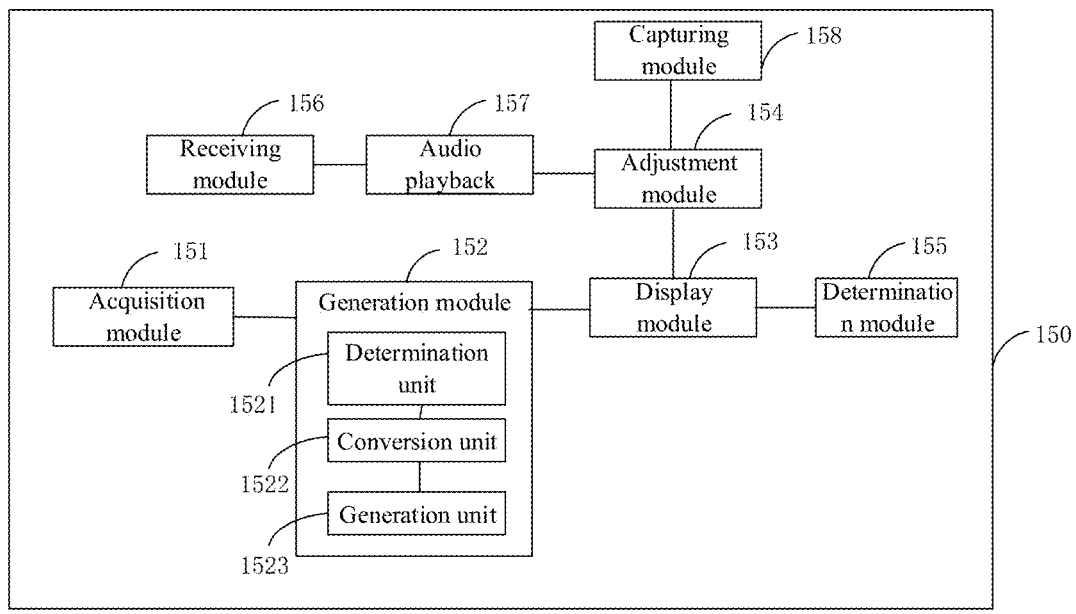
FIG. 15 is a schematic structural diagram of an apparatus for processing an image according to an embodiment of the present disclosure.

FIG. 15 is a schematic structural diagram of an apparatus for processing an image according to an embodiment of the present disclosure. The apparatus for processing an image according to the embodiment of the present disclosure may be configured in a client device or a server. The apparatus for processing an image 150 specifically includes an acquisition module 151, a generation module 152 and a display module 153.

The acquisition module 151 is configured to acquire a sliding trajectory inputted by a user on a display component.

The generation module 152 is configured to generate a first virtual model corresponding to the sliding trajectory based on the sliding trajectory.

The display module 153 is configured to display the first virtual model in a target image at a first position.

Optionally, the generation module 152 includes a determination unit 1521, a conversion unit 1522 and a generation unit 1523.

The determination unit 1521 is configured to determine multiple target points associated with the sliding trajectory based on the sliding trajectory.

The acquisition module 151 is further configured to acquire, for each of the multiple target points, a preset sub-model corresponding to the target point.

The conversion unit 1522 is configured to convert, for each of the multiple target points, the preset sub-model corresponding to the target point into a target sub-model based on geometric information of the target point.

The generation unit 1523 is configured to generate a first virtual model corresponding to the sliding trajectory based on target sub-models corresponding to respective target points.

Optionally, the determination unit 1521 is further configured to: when determining multiple target points associated with the sliding trajectory based on the sliding trajectory, determine multiple trajectory points in the sliding trajectory based on the sliding trajectory; perform fitting calculation on the multiple trajectory points to obtain a fitted curve; and sample the fitted curve to obtain multiple target points associated with the sliding trajectory, where the target points include sampling points on the fitted curve.

Optionally, the geometric information of the target point includes at least one of:
an offset of the target point relative to a starting trajectory point of the multiple trajectory points; or
a tangential direction of the target point on the fitted curve.

Optionally, the geometric information of the target point includes an offset of the target point relative to a starting trajectory point of the multiple trajectory points and a tangential direction of the target point on the fitted curve. The conversion unit 1522 is further configured to: convert multiple first points on the preset sub-model corresponding to the target point into corresponding multiple second points, based on the offset of the target point relative to the starting trajectory point and the tangent direction of the target point on the fitted curve; and generate the target sub-model corresponding to the target point based on the multiple second points.

Optionally, the conversion unit 1522 is further configured to: when converting multiple first points on the preset sub-model corresponding to the target point into corresponding multiple second points, based on the offset of the target point relative to the starting trajectory point and the tangent direction of the target point on the fitted curve, convert the offset of the target point relative to the starting trajectory point to a three-dimensional offset; convert the tangential direction of the target point on the fitted curve to a three-dimensional tangential direction; and convert the multiple first points on the preset sub-model corresponding to the target point into the corresponding multiple second points based on the three-dimensional offset and the three-dimensional tangent direction.

Optionally, the conversion unit 1522 is further configured to: when converting the multiple first points on the preset sub-model corresponding to the target point into the corresponding multiple second points based on the three-dimensional offset and the three-dimensional tangent direction, convert the multiple first points on the preset sub-model corresponding to the target point into the corresponding multiple second points based on the three-dimensional offset, the three-dimensional tangential direction and a scaling value corresponding to the target point.

Optionally, the generation unit 1523 is further configured to: when generating a first virtual model corresponding to the sliding trajectory based on target sub-models corresponding to the respective target points, join the target sub-models corresponding to respective target points based on an identifier of each target point, to obtain the first virtual model corresponding to the sliding trajectory, where the identifier of the target point is used to determine a position of the target sub-model corresponding to the target point in the first virtual model.

Optionally, the apparatus for processing an image 150 further includes an adjustment module 154, configured to adjust a direction of the first virtual model based on a sliding direction of the sliding trajectory.

Optionally, the adjustment module 154 is further configured to: when adjusting a direction of the first virtual model based on a sliding direction of the sliding trajectory, determine a direction of the starting trajectory point in the sliding trajectory relative to other trajectory points in the sliding trajectory; perform aggregation calculation on the direction of the starting trajectory point in the sliding trajectory relative to the other trajectory points in the sliding trajectory, to obtain an aggregated direction; and adjust the direction of the first virtual model based on the aggregated direction.

Optionally, the display module 153 is further configured to: when displaying the first virtual model in a target image at a first position, display the first virtual model at the first position of a target object in the target image.

Optionally, the apparatus for processing an image 150 further includes a determination module 155 and a receiving module 156. The receiving module 156 is configured to: after the display module 153 displays the first virtual model at the first position of the target object in the target image, receive a mirroring control instruction. The determination module 155 is configured to determine, in response to the mirroring control instruction, a second position symmetrical to the first position on the target object. The display module 153 is further configured to display, at the second position, a second virtual model which is a mirror image of the first virtual model.

Optionally, the adjustment module 154 is further configured to: after the display module 153 displays the first virtual model in a target image at a first position, adjust a parameter of the first virtual model; and update the first virtual model based on the adjusted parameter.

Optionally, the adjustment module 154 is further configured to: when adjusting a parameter of the first virtual model, receive a parameter adjustment instruction for the first virtual model; and adjust, in response to the parameter adjustment instruction, the parameter of the first virtual model.

Optionally, the acquisition module 151 is further configured to acquire audio information. The adjustment module 154 is further configured to: when adjusting the parameter of the first virtual model, adjust the parameter of the first virtual model based on a parameter of the audio information.

Optionally, the apparatus for processing an image 150 further includes an audio playback module 157. The receiving module 156 is configured to: receive an audio playback instruction before the acquisition module 151 acquires the audio information. The audio playback module 157 is configured to play the audio information in response to the audio playback instruction.

Optionally, the apparatus for processing an image 150 further includes a capturing module 158, configured to capture audio information in a surrounding environment.

The steps executed by the client device or the server of the method for processing an image according to the method embodiment of the present disclosure may be performed by the apparatus for processing an image according to the embodiment of the present disclosure. The specific steps implemented and advantageous effects are not repeated herein.

Figure 16:
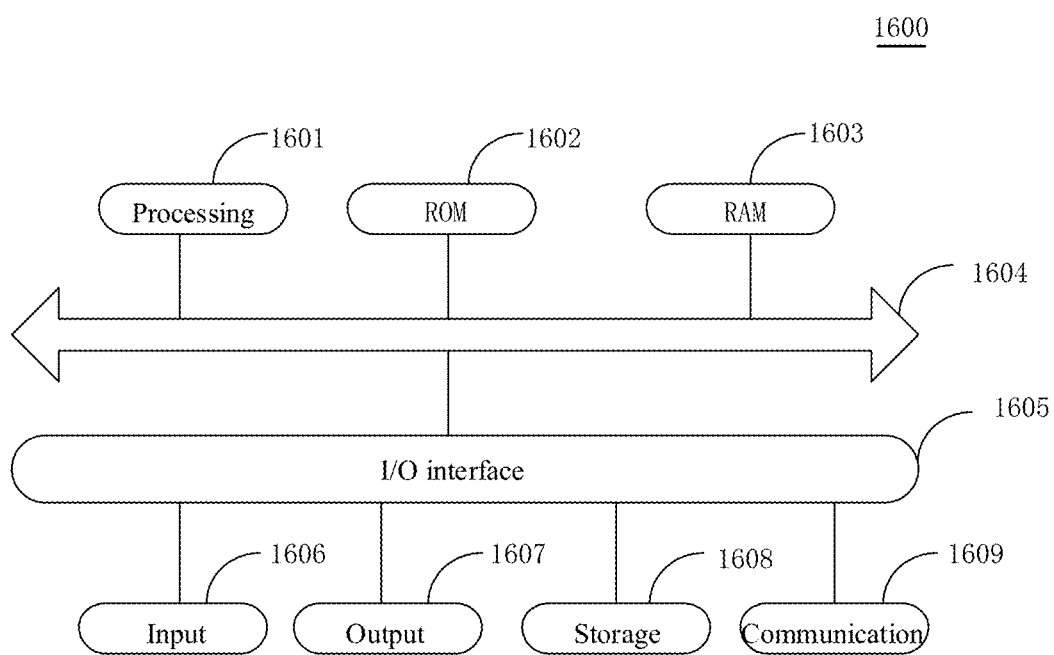
FIG. 16 is a schematic structural diagram of an electronic device according to an embodiment of the present disclosure.

FIG. 16 is a schematic structural diagram of an electronic device according to an embodiment of the present disclosure. Hereinafter reference is made to FIG. 16 which shows a schematic structural diagram of an electronic device 1600 suitable for implementing the embodiments of the present disclosure. The electronic device 1600 in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 16 is exemplary, and is not intended to limit the function and usage scope of the embodiments of the present disclosure.

As shown in FIG. 16, the electronic device 1600 may include a processing apparatus (such as a central processor and a graphic processor) 1601. The processing apparatus may perform various appropriate actions and processing based on programs stored in a read-only memory (ROM) 1602 or programs uploaded from a storage apparatus 1608 to a random access memory (RAM) 1603. Various programs and data required for operations of the electronic device 1600 are also stored in the RAM 1603. The processing apparatus 1601, the ROM 1602 and the RAM 1603 are connected to each other through the bus 1604. An input/output (I/O) interface 1605 is also connected to the bus 1604.

Generally, the following apparatuses may be connected to the I/O interface 1605: an input apparatus 1606 such as a touch screen, a touch panel, a keyboard, a mouse, a camera, a microphone, an accelerometer, and gyroscope; an output apparatus 1607 such as a liquid crystal display (LCD), a loudspeaker and a vibrator; a storage apparatus 1608 such as a magnetic tape and a hard disk; and a communication apparatus 1609. The communication apparatus 1609 may allow the electronic device 1600 to communicate with other device in a wired or wireless manner to exchange data. Although FIG. 16 shows the electronic device 1600 provided with various apparatuses, it should be understood that not all shown apparatuses are required to be implemented or included. Alternatively, more or less apparatuses may be implemented or included.

According to the embodiments of the present disclosure, a process described with reference to the flowchart above may particularly be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 1609, installed from the storage apparatus 1608 or installed from the ROM 1602. The computer program is executed by the processing apparatus 1601 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client device and the server may perform communication by using any known network protocol such as Hyper Text Transfer Protocol (HTTP) or any network protocol to be developed in the further, and may connect with digital data communication in any form or carried in any medium (for example, a communication network). Examples of the communication network include a local area network (LAN), a wide area network (WAN), Internet, and an end-to-end network (such as, ad hoc end-to-end network), and any currently known or future developed network.

The computer readable medium may be included in the electronic device, or may stand alone without being assembled into the electronic device.

The computer readable medium carries one or more programs. The one or more programs, when executed by the electronic device, cause the electronic device to perform the following operations:
  acquiring a sliding trajectory inputted by a user on a display component;
  generating a first virtual model corresponding to the sliding trajectory based on the sliding trajectory; and
  displaying the first virtual model in a target image at a first position.

In addition, the electronic device may further perform other steps of the foregoing method for processing an image.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs, which may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the present disclosure, a method for processing an image is provided according to the present disclosure. The method includes:
  acquiring a sliding trajectory inputted by a user on a display component;
  generating a first virtual model corresponding to the sliding trajectory based on the sliding trajectory; and
  displaying the first virtual model in a target image at a first position.

According to one or more embodiments of the present disclosure, in the method for processing an image according to the present disclosure, the generating a first virtual model corresponding to the sliding trajectory based on the sliding trajectory includes:
  determining multiple target points associated with the sliding trajectory based on the sliding trajectory;
  acquiring, for each of the multiple target points, a preset sub-model corresponding to the target point;
  converting, for each of the multiple target points, the preset sub-model corresponding to the target point to a target sub-model based on geometric information of the target point; and
  generating a first virtual model corresponding to the sliding trajectory based on the target sub-models corresponding to respective target points.

According to one or more embodiments of the present disclosure, in the method for processing an image according to the present disclosure, the determining multiple target points associated with the sliding trajectory based on the sliding trajectory includes:
  determining multiple trajectory points in the sliding trajectory based on the sliding trajectory;
  performing fitting calculation on the multiple trajectory points to obtain a fitted curve; and
  sampling the fitted curve to obtain multiple target points associated with the sliding trajectory, where the target points include sampling points on the fitted curve.

According to one or more embodiments of the present disclosure, in the method for processing an image according to the present disclosure, the geometric information of the target point includes at least one of:
  an offset of the target point relative to a starting trajectory point of the multiple trajectory points; or
  a tangential direction of the target point on the fitted curve;
  where, the converting, for each of the multiple target points, the preset sub-model corresponding to the target point to a target sub-model based on geometric information of the target point, includes:
  converting the preset sub-model corresponding to the target point to the target sub-model based on the offset of the target point relative to the starting trajectory point and the tangent direction of the target point on the fitted curve.

According to one or more embodiments of the present disclosure, in the method for processing an image according to the present disclosure, the converting, for each of the multiple target points, the preset sub-model corresponding to the target point to a target sub-model based on geometric information of the target point, includes:
  converting multiple first points on the preset sub-model corresponding to the target point into corresponding multiple second points, based on the offset of the target point relative to the starting trajectory point and the tangent direction of the target point on the fitted curve; and generating the target sub-model corresponding to the target point based on the multiple second points.

According to one or more embodiments of the present disclosure, in the method for processing an image according to the present disclosure, the converting multiple first points on the preset sub-model corresponding to the target point into corresponding multiple second points, based on the offset of the target point relative to the starting trajectory point and the tangent direction of the target point on the fitted curve includes converting the offset of the target point relative to the starting trajectory point to a three-dimensional offset;

converting the tangential direction of the target point on the fitted curve to a three-dimensional tangential direction; and converting the multiple first points on the preset sub-model corresponding to the target point to the corresponding multiple second points based on the three-dimensional offset and the three-dimensional tangent direction.

According to one or more embodiments of the present disclosure, in the method for processing an image according to the present disclosure, the converting the multiple first points on the preset sub-model corresponding to the target point into the corresponding multiple second points based on the three-dimensional offset and the three-dimensional tangent direction includes:

converting the multiple first points on the preset sub-model corresponding to the target point into the corresponding multiple second points based on the three-dimensional offset, the three-dimensional tangential direction and a scaling value corresponding to the target point.

According to one or more embodiments of the present disclosure, in the method for processing an image according to the present disclosure, the generating a first virtual model corresponding to the sliding trajectory based on target sub-models corresponding to respective target points includes:

joining the target sub-models corresponding to respective target points based on an identifier of each target point, to obtain the first virtual model corresponding to the sliding trajectory, where the identifier of the target point is used to determine a position of the target sub-model corresponding to the target point in the first virtual model.

According to one or more embodiments of the present disclosure, in the method for processing an image according to the present disclosure, the method further includes:

adjusting a direction of the first virtual model based on a sliding direction of the sliding trajectory.

According to one or more embodiments of the present disclosure, in the method for processing an image according to the present disclosure, the adjusting a direction of the first virtual model based on a sliding direction of the sliding trajectory includes:

determining a direction of the starting trajectory point in the sliding trajectory relative to other trajectory points in the sliding trajectory;

performing aggregation calculation on the direction of the starting trajectory point in the sliding trajectory relative to the other trajectory points in the sliding trajectory, to obtain an aggregated direction; and adjusting the direction of the first virtual model based on the aggregated direction.

According to one or more embodiments of the present disclosure, in the method for processing an image according to the present disclosure, the displaying the first virtual model in a target image at a first position includes:

displaying the first virtual model at the first position of a target object in the target image.

According to one or more embodiments of the present disclosure, in the method for processing an image according to the present disclosure, after displaying the first virtual model at the first position of a target object in the target image, the method further includes:

receiving a mirroring control instruction;

determining, in response to the mirroring control instruction, a second position symmetrical to the first position on the target object; and displaying, at the second position, a second virtual model which is a mirror image of the first virtual model.

According to one or more embodiments of the present disclosure, in the method for processing an image according to the present disclosure, after displaying the first virtual model in a target image at a first position, the method further includes:

adjusting a parameter of the first virtual model; and updating the first virtual model based on the adjusted parameter.

According to one or more embodiments of the present disclosure, in the method for processing an image according to the present disclosure, the adjusting a parameter of the first virtual model includes:

receiving a parameter adjustment instruction for the first virtual model;

adjusting, in response to the parameter adjustment instruction, the parameter of the first virtual model.

According to one or more embodiments of the present disclosure, in the method for processing an image according to the present disclosure, the adjusting a parameter of the first virtual model includes:

acquiring audio information; and adjusting the parameter of the first virtual model based on a parameter of the audio information.

According to one or more embodiments of the present disclosure, in the method for processing an image according to the present disclosure, before acquiring audio information, the method further includes:

receiving an audio playback instruction; and playing the audio information in response to the audio playback instruction.

According to one or more embodiments of the present disclosure, in the method for processing an image according to the present disclosure, the acquiring audio information includes:

capturing audio information in a surrounding environment.

According to one or more embodiments of the present disclosure, an apparatus for processing an image is provided according to the present disclosure. The apparatus includes an acquisition module, a generation module and a display module.

The acquisition module is configured to acquire a sliding trajectory inputted by a user on a display component.

The generation module is configured to generate a first virtual model corresponding to the sliding trajectory based on the sliding trajectory.

The display module is configured to display the first virtual model in a target image at a first position.

According to one or more embodiments of the present disclosure, an apparatus for processing an image is provided according to the present disclosure. The generation module includes a determination unit, a conversion unit and a generation unit.

The determination unit is configured to determine multiple target points associated with the sliding trajectory based on the sliding trajectory.

The acquisition module is further configured to acquire, for each of the multiple target points, a preset sub-model corresponding to the target point. The conversion unit is configured to convert, for each of the multiple target points, the preset sub-model corresponding to the target point into a target sub-model based on geometric information of the target point.

The generation unit is configured to generate a first virtual model corresponding to the sliding trajectory based on target sub-models corresponding to respective target points.

According to one or more embodiments of the present disclosure, an apparatus for processing an image is provided according to the present disclosure. The determination unit is further configured to: when determining multiple target points associated with the sliding trajectory based on the sliding trajectory, determine multiple trajectory points in the sliding trajectory based on the sliding trajectory; perform fitting calculation on the multiple trajectory points to obtain a fitted curve; and sample the fitted curve to obtain multiple sampling points on the fitted curve as multiple target points associated with the sliding trajectory.

According to one or more embodiments of the present disclosure, an apparatus for processing an image is provided according to the present disclosure. The geometric information of the target point includes at least one of:
 an offset of the target point relative to a starting trajectory point of the multiple trajectory points; or
 a tangential direction of the target point on the fitted curve.

According to one or more embodiments of the present disclosure, an apparatus for processing an image is provided according to the present disclosure. The conversion unit is further configured to: convert multiple first points on the preset sub-model corresponding to the target point to corresponding multiple second points, based on the offset of the target point relative to the starting trajectory point and the tangent direction of the target point on the fitted curve; and generate the target sub-model corresponding to the target point based on the multiple second points.

According to one or more embodiments of the present disclosure, an apparatus for processing an image is provided according to the present disclosure. The conversion unit is further configured to: convert the offset of the target point relative to the starting trajectory point to a three-dimensional offset; convert the tangential direction of the target point on the fitted curve to a three-dimensional tangential direction; and convert the multiple first points on the preset sub-model corresponding to the target point to the corresponding multiple second points based on the three-dimensional offset and the three-dimensional tangent direction.

According to one or more embodiments of the present disclosure, an apparatus for processing an image is provided according to the present disclosure. The conversion unit is further configured to: when converting the multiple first points on the preset sub-model corresponding to the target point to the corresponding multiple second points based on the three-dimensional offset and the three-dimensional tangent direction, convert the multiple first points on the preset sub-model corresponding to the target point to the corresponding multiple second points based on the three-dimensional offset, the three-dimensional tangential direction and a scaling value corresponding to the target point.

According to one or more embodiments of the present disclosure, an apparatus for processing an image is provided according to the present disclosure. The generation unit is further configured to: when generating a first virtual model corresponding to the sliding trajectory based on target sub-models corresponding to the respective target points, join the target sub-models corresponding to the respective target points based on an identifier of each target point, to obtain the first virtual model corresponding to the sliding trajectory, where the identifier of the target point is used to determine a position of the target sub-model corresponding to the target point in the first virtual model.

According to one or more embodiments of the present disclosure, an apparatus for processing an image is provided according to the present disclosure. The apparatus for processing an image further includes an adjustment module, configured to adjust a direction of the first virtual model based on a sliding direction of the sliding trajectory.

According to one or more embodiments of the present disclosure, an apparatus for processing an image is provided according to the present disclosure. The adjustment module is further configured to: when adjusting a direction of the first virtual model based on a sliding direction of the sliding trajectory, determine a direction of the starting trajectory point in the sliding trajectory relative to other trajectory points in the sliding trajectory; perform aggregation calculation on the direction of the starting trajectory point in the sliding trajectory relative to the other trajectory points in the sliding trajectory, to obtain an aggregated direction; and adjust the direction of the first virtual model based on the aggregated direction.

According to one or more embodiments of the present disclosure, an apparatus for processing an image is provided according to the present disclosure. The display module is further configured to: when displaying the first virtual model in a target image at a first position, display the first virtual model at the first position of a target object in the target image.

According to one or more embodiments of the present disclosure, an apparatus for processing an image is provided according to the present disclosure. The apparatus for processing an image further includes a determination module and a receiving module. The receiving module is configured to: after the display module displays the first virtual model at the first position of a target object in the target image, receive a mirroring control instruction. The determination module is configured to determine, in response to the mirroring control instruction, a second position symmetrical to the first position on the target object. The display module is further configured to display, at the second position, a second virtual model which is a mirror image of the first virtual model.

According to one or more embodiments of the present disclosure, an apparatus for processing an image is provided according to the present disclosure. The adjustment module is further configured to: after the display module displays the first virtual model in a target image at a first position, adjust a parameter of the first virtual model; and update the first virtual model based on the adjusted parameter.

According to one or more embodiments of the present disclosure, an apparatus for processing an image is provided according to the present disclosure. The adjustment module is further configured to: when adjusting a parameter of the first virtual model, receive a parameter adjustment instruction for the first virtual model; and adjust, in response to the parameter adjustment instruction, the parameter of the first virtual model.

According to one or more embodiments of the present disclosure, an apparatus for processing an image is provided according to the present disclosure. The acquisition module is further configured to acquire audio information. The adjustment module is further configured to: when adjusting the parameter of the first virtual model, adjust the parameter of the first virtual model based on a parameter of the audio information.

According to one or more embodiments of the present disclosure, an apparatus for processing an image is provided according to the present disclosure. The apparatus for processing an image further includes an audio playback module. The receiving module is configured to: receive an audio playback instruction before the acquisition module acquires the audio information. The audio playback module is configured to play the audio information in response to the audio playback instruction.

According to one or more embodiments of the present disclosure, an apparatus for processing an image is provided according to the present disclosure. The apparatus for processing an image further includes a capturing module, configured to capture audio information in a surrounding environment.

According to one or more embodiments of the present disclosure, an electronic device is provided according to the present disclosure. The electronic device includes:
  one or more processors;
  a storage device configured to store one or more programs, where
  the one or more programs, when being executed by the one or more processors, cause the one or more processors to perform the method for processing an image according to any one of the embodiments of the present disclosure.

According to one or more embodiments of the present disclosure, a computer-readable storage medium is provided according to the present disclosure. A computer-readable storage medium has a computer program stored thereon, where the computer program, when being executed by a processor, implement the method for processing an image according to any one of the embodiments of the present disclosure.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and actions described above are merely example forms of implementing the claims.

The invention claimed is:

1. A method for processing an image, comprising:
  acquiring a sliding trajectory inputted by a user on a display component;
  generating, based on the sliding trajectory, a first virtual model corresponding to the sliding trajectory; and
  displaying the first virtual model in a target image at a first position,
  wherein the generating, based on the sliding trajectory, the first virtual model corresponding to the sliding trajectory comprises:
  determining, based on the sliding trajectory, a plurality of target points associated with the sliding trajectory;
  acquiring, for each of the plurality of target points, a preset sub-model corresponding to the target point;
  for each of the plurality of target points, converting the preset sub-model corresponding to the target point into a target sub-model based on geometric information of the target point; and
  generating the first virtual model corresponding to the sliding trajectory based on the target sub-models corresponding to the respective target points.

2. The method according to claim 1, wherein the determining, based on the sliding trajectory, a plurality of target points associated with the sliding trajectory comprises:
  determining, based on the sliding trajectory, a plurality of trajectory points in the sliding trajectory;
  performing fitting calculation on the plurality of trajectory points to obtain a fitted curve; and
  sampling the fitted curve to obtain the plurality of target points associated with the sliding trajectory, wherein the target points comprise sampling points on the fitted curve.

3. The method according to claim 2, wherein the geometric information of the target point comprises at least one of:
  an offset of the target point relative to a starting trajectory point in the plurality of trajectory points; and
  a tangential direction of the target point on the fitted curve.

4. The method according to claim 3, wherein the geometric information of the target point comprises the offset of the target point relative to the starting trajectory point in the plurality of trajectory points and the tangential direction of the target point on the fitted curve, and the converting, based on geometric information of the target point, the preset sub-model corresponding to the target point into a target sub-model comprises:
  converting a plurality of first points on the preset sub-model corresponding to the target point into a plurality of second points, based on the offset of the target point relative to the starting trajectory point and a tangent direction of the target point on the fitted curve; and
  generating the target sub-model corresponding to the target point based on the plurality of second points.

5. The method according to claim 4, wherein the converting a plurality of first points on the preset sub-model corresponding to the target point into a plurality of second points, based on the offset of the target point relative to the starting trajectory point and the tangent direction of the target point on the fitted curve comprises:
converting the offset of the target point relative to the starting trajectory point to a three-dimensional offset;
converting the tangential direction of the target point on the fitted curve to a three-dimensional tangential direction; and
converting the plurality of first points on the preset sub-model corresponding to the target point into the plurality of second points, based on the three-dimensional offset and the three-dimensional tangent direction.

6. The method according to claim 5, wherein the converting the plurality of first points on the preset sub-model corresponding to the target point into the plurality of second points based on the three-dimensional offset and the three-dimensional tangent direction comprises:
converting the plurality of first points on the preset sub-model corresponding to the target point into the plurality of second points based on the three-dimensional offset, the three-dimensional tangential direction and a scaling value corresponding to the target point.

7. The method according to claim 1, wherein the generating the first virtual model corresponding to the sliding trajectory based on the target sub-models corresponding to respective target points comprises:
joining the target sub-models corresponding to the respective target points based on an identifier of each target point, to obtain the first virtual model corresponding to the sliding trajectory,
wherein the identifier of the target point is used to determine a position of the target sub-model corresponding to the target point in the first virtual model.

8. The method according to claim 1, further comprising:
adjusting a direction of the first virtual model based on a sliding direction of the sliding trajectory.

9. The method according to claim 8, wherein the adjusting a direction of the first virtual model based on a sliding direction of the sliding trajectory comprises:
determining a direction of a starting trajectory point in the sliding trajectory relative to other trajectory points in the sliding trajectory;
performing aggregation calculation on the direction of the starting trajectory point in the sliding trajectory relative to the other trajectory points in the sliding trajectory, to obtain an aggregated direction; and
adjusting the direction of the first virtual model based on the aggregated direction.

10. The method according to claim 1, wherein the displaying the first virtual model in a target image at a first position comprises:
displaying the first virtual model at the first position of a target object in the target image.

11. The method according to claim 10, wherein, after displaying the first virtual model at the first position of a target object in the target image, the method further comprises:
receiving a mirroring control instruction;
determining, in response to the mirroring control instruction, a second position symmetrical to the first position on the target object; and
displaying, at the second position, a second virtual model which is a mirror image of the first virtual model.

12. The method according to claim 1, wherein, after displaying the first virtual model in a target image at a first position, the method further comprises:
adjusting a parameter of the first virtual model; and
updating the first virtual model based on the adjusted parameter.

13. The method according to claim 12, wherein, the adjusting a parameter of the first virtual model comprises:
receiving a parameter adjustment instruction for the first virtual model;
adjusting, in response to the parameter adjustment instruction, the parameter of the first virtual model.

14. The method according to claim 12, wherein, the adjusting a parameter of the first virtual model comprises:
acquiring audio information; and
adjusting the parameter of the first virtual model based on a parameter of the audio information.

15. The method according to claim 14, wherein, before acquiring audio information, the method further comprises:
receiving an audio playback instruction; and
playing the audio information in response to the audio playback instruction.

16. The method according to claim 14, wherein, the acquiring audio information comprises:
capturing audio information in a surrounding environment.

17. An electronic device, comprising:
one or more processors;
a storage device configured to store one or more programs, wherein
the one or more programs, when being executed by the one or more processors, cause the one or more processors to perform:
acquiring a sliding trajectory inputted by a user on a display component;
generating, based on the sliding trajectory, a first virtual model corresponding to the sliding trajectory; and
displaying the first virtual model in a target image at a first position,
wherein the one or more processors are further configured to perform:
determining, based on the sliding trajectory, a plurality of target points associated with the sliding trajectory;
acquiring, for each of the plurality of target points, a preset sub-model corresponding to the target point;
for each of the plurality of target points, converting the preset sub-model corresponding to the target point into a target sub-model based on geometric information of the target point; and
generating the first virtual model corresponding to the sliding trajectory based on the target sub-models corresponding to the respective target points.

18. A non-transitory computer-readable storage medium having a computer program stored thereon, wherein the computer program, when being executed by a processor, implements:
acquiring a sliding trajectory inputted by a user on a display component;
generating, based on the sliding trajectory, a first virtual model corresponding to the sliding trajectory; and
displaying the first virtual model in a target image at a first position,
wherein the generating, based on the sliding trajectory, the first virtual model corresponding to the sliding trajectory comprises:
determining, based on the sliding trajectory, a plurality of target points associated with the sliding trajectory;
acquiring, for each of the plurality of target points, a preset sub-model corresponding to the target point;

for each of the plurality of target points, converting the preset sub-model corresponding to the target point into a target sub-model based on geometric information of the target point; and generating the first virtual model corresponding to the sliding trajectory based on the target sub-models corresponding to the respective target points.

\* \* \* \* \*